(12) United States Patent
Fleming et al.

(10) Patent No.: US 12,737,827 B1
(45) Date of Patent: Sep. 15, 2026

(54) ALIGNING PRODUCTS AND/OR TECHNOLOGIES TO INTELLECTUAL PROPERTY USING LANGUAGE MODELING

(71) Applicant: Moat Metrics, Inc., Spokane, WA (US)

(72) Inventors: Samuel Cameron Fleming, Spokane, WA (US); Lucas Shoop, Spokane, WA (US)

(73) Assignee: Moat Metrics, Inc., Spokane, WA (US)

( * ) Notice: Subject to any disclaimer, the term of this patent is extended or adjusted under 35 U.S.C. 154(b) by 1 day.

(21) Appl. No.: 18/737,705

(22) Filed: Jun. 7, 2024

(51) Int. Cl.
*G06Q 50/18* (2012.01)

(52) U.S. Cl.
CPC .................................. *G06Q 50/184* (2013.01)

(58) Field of Classification Search
CPC .................................................... G06Q 50/184
USPC ............................ 705/310; 700/91; 707/769
See application file for complete search history.

(56) References Cited

U.S. PATENT DOCUMENTS 8,131,612 B1 * 3/2012 Payne .................... G06Q 40/06 705/37
10,019,442 B2 7/2018 Nefedov et al.
10,891,701 B2 1/2021 Jessen et al.
11,048,709 B2 6/2021 Lundberg
12,111,859 B2 10/2024 Siebel et al.
12,608,540 B1 * 4/2026 Shardha ................ G06F 40/194
2007/0208719 A1 9/2007 Tran
2010/0250479 A1 9/2010 Carter
2011/0246380 A1 10/2011 Resnick et al.
2013/0085947 A1 4/2013 Lundberg
2013/0218912 A1 * 8/2013 Howard ............. G06Q 30/0633 707/769
2015/0081654 A1 3/2015 Spangler et al.
2015/0217163 A1 * 8/2015 Amis ................. A63B 24/0062 700/91
2018/0232428 A1 8/2018 Fleming et al.
2021/0004919 A1 * 1/2021 Lee ...................... G06Q 50/184
2022/0101464 A1 3/2022 Lee et al.
2024/0311858 A1 * 9/2024 Dumoulin .............. G06Q 40/06
2024/0370954 A1 * 11/2024 Ryan .................... G06Q 50/184
2024/0370955 A1 * 11/2024 Ryan .................... G06Q 50/184
2024/0370956 A1 * 11/2024 Ryan .................... G06Q 50/184
2024/0370957 A1 * 11/2024 Ryan .................... G06Q 50/184
2025/0077238 A1 * 3/2025 Obando Chacon ... G06F 40/284
2025/0139149 A1 * 5/2025 Lee .................... G06Q 10/0637
2025/0238629 A1 * 7/2025 Malkiel ................ G06F 40/194
2026/0111480 A1 * 4/2026 Lee ......................... G06F 16/45

OTHER PUBLICATIONS

Changlong, Building commonsense knowledge graphs to aid product recommendation, 2024 (Year: 2024).*

(Continued)

*Primary Examiner* — Tarek Elchanti
(74) *Attorney, Agent, or Firm* — Lee & Hayes, P.C.

(57) ABSTRACT

Systems and methods for generation and use of IP (IP) mapping platform architectures are disclosed. A mapping component may be utilized to obtain product lists, technology area lists, and/or sub-technology lists in varying areas of interest, such as, for example, target technical fields, targeted publications, targeted products, and/or entity portfolios. The mapping component may be further utilized to vectorize text descriptions and/or IP assets used to generate one or more visual representations.

20 Claims, 16 Drawing Sheets

(56) References Cited

OTHER PUBLICATIONS

Office Action for U.S. Appl. No. 18/737,659, dated Jul. 24, 2025, 49 Pages.
Office Action for U.S. Appl. No. 18/737,687, dated Jul. 29, 27 Pages.
Office Action for U.S. Appl. No. 18/737,575, dated Mar. 6, 2026, 26 Pages.
Office Action for U.S. Appl. No. 18/737,687, dated Dec. 4, 2025, 33 Pages.
Office Action for U.S. Appl. No. 18/737,659, dated Dec. 8, 2025, 46 Pages.

* cited by examiner

200

PROCESSOR(S) 116

NETWORK INTERFACE(S) 118

COMPUTER-READABLE MEDIA 120

MAPPING COMPONENT 122

SEARCH COMPONENT 212

SIMILARITY COMPONENT 218

VECTOR COMPONENT 220

RANKING COMPONENT 222

USER INTERFACE GENERATION COMPONENT 214

AI INTERFACE COMPONENT 216

CLUSTERING COMPONENT 258

MACHINE LEARNING COMPONENT 256

SCORING COMPONENT 124

COVERAGE COMPONENT 228

GEOGRAPHIC DISTRIBUTION COMPONENT 234

EXPIRATION COMPONENT 236

COMPREHENSIVE BREADTH SCORE COMPONENT 238

DIVERSITY COMPONENT 240

REVENUE ALIGNMENT COMPONENT 242

INVALIDITY COMPONENT 244

OPPORTUNITY COMPONENT 230

FILING VELOCITY COMPONENT 246

PREDICTIVE ANALYTICS COMPONENT 248

PRECEDENCE COMPONENT 250

EXPOSURE COMPONENT 232

LITIGATION CAMPAIGN COMPONENT 252

ALIGNMENT TO EXPOSURE COMPONENT 254

REMOTE COMPUTING RESOURCES 104

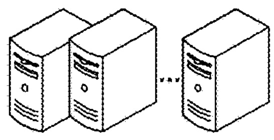

FIG. 2A

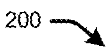
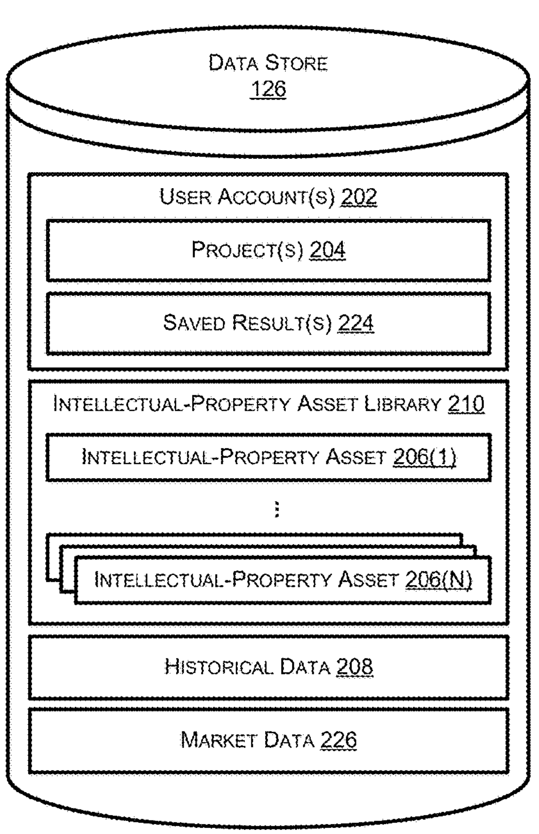
REMOTE COMPUTING RESOURCES 104
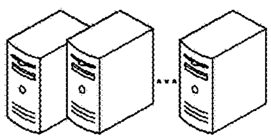
FIG. 2B

600

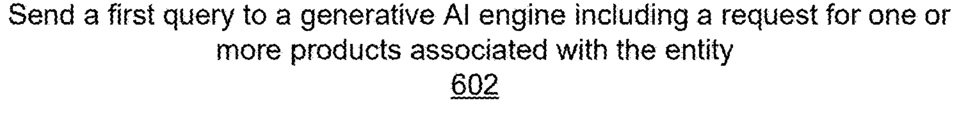

Identify the one or more products associated with the entity based at least in part on receiving a first output from the generative AI engine
604

Send a second query to the generative AI engine including a request for one or more technology areas associated with the one or more products
606

Identify the one or more technology areas associated with each of the one or more products based at least in part on a second output from the generative AI engine
608

Present, on a graphical user interface (GUI) displayed on a computing device, a flowchart including an entity name associated with the entity, the one or more products, and the one or more technology areas, wherein the flowchart illustrates the entity name mapped to the one or more products and the one or more products mapped to the one or more technology areas via a number of flows
610

FIG. 6

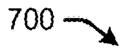

Identify an entity associated with one or more intellectual property (IP) assets
702

Send a first query to a generative AI engine including a request for one or more products associated with the entity
704

Identify the one or more products associated with the entity based at least in part on receiving a first output from the generative AI engine
706

Send a second query to the generative AI engine including a request for one or more technology areas associated with the one or more products
708

Identify the one or more technology areas associated with each of the one or more products based at least in part on a second output from the generative AI engine
710

Map the one or more IP assets to the one or more technology areas
712

Present, on a graphical user interface (GUI) displayed on a computing device, a flowchart including an entity name associated with the entity, the one or more products, the one or more technology areas, and the one or more IP assets, wherein the flowchart illustrates the entity name mapped to the one or more products and the one or more products mapped to the one or more technology areas via a number of flows
714

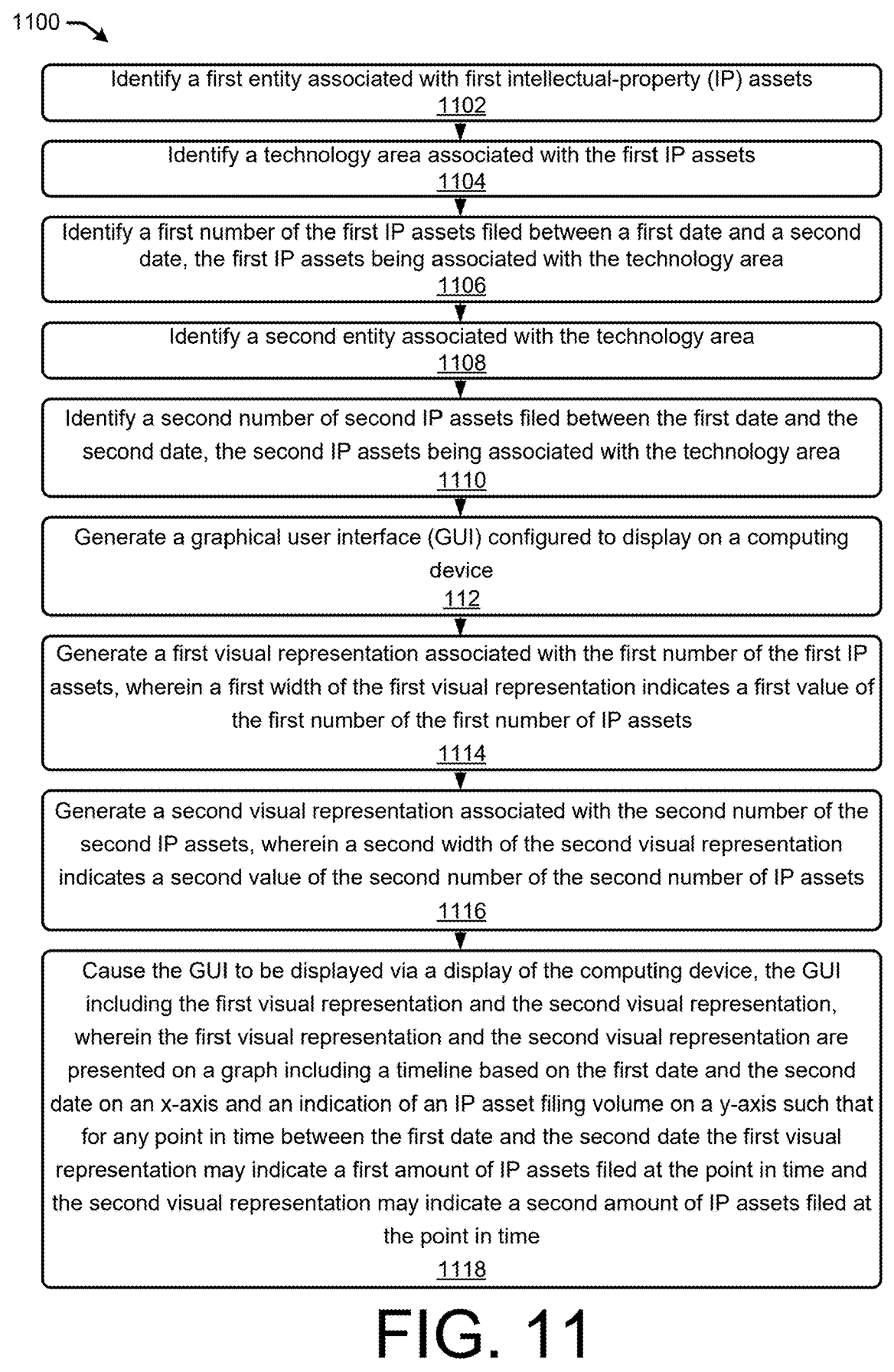

Identify a first entity associated with first intellectual-property (IP) assets
1102

Identify a technology area associated with the first IP assets
1104

Identify a first number of the first IP assets filed between a first date and a second date, the first IP assets being associated with the technology area
1106

Identify a second entity associated with the technology area
1108

Identify a second number of second IP assets filed between the first date and the second date, the second IP assets being associated with the technology area
1110

Generate a graphical user interface (GUI) configured to display on a computing device
112

Generate a first visual representation associated with the first number of the first IP assets, wherein a first width of the first visual representation indicates a first value of the first number of the first number of IP assets
1114

Generate a second visual representation associated with the second number of the second IP assets, wherein a second width of the second visual representation indicates a second value of the second number of the second number of IP assets
1116

Cause the GUI to be displayed via a display of the computing device, the GUI including the first visual representation and the second visual representation, wherein the first visual representation and the second visual representation are presented on a graph including a timeline based on the first date and the second date on an x-axis and an indication of an IP asset filing volume on a y-axis such that for any point in time between the first date and the second date the first visual representation may indicate a first amount of IP assets filed at the point in time and the second visual representation may indicate a second amount of IP assets filed at the point in time
1118

FIG. 11

ALIGNING PRODUCTS AND/OR TECHNOLOGIES TO INTELLECTUAL PROPERTY USING LANGUAGE MODELING

BACKGROUND

Analyzing an intellectual property (IP) portfolio of a particular entity with respect to a technology space and/or products that the entity produces may provide various insights and can be valuable. However, determining the IP asset(s) that correspond to a particular product and/or underlying technology is difficult. Disclosed herein are improvements in technology and solutions to technical problems that can be used to, among other things, analyze and generate visual representations of IP portfolios of various entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B illustrate a component diagram of example components of a remote computing resource for the IP mapping platform.

FIG. 6 illustrates an example flow diagram of an example process for communicating with a language model interface to obtain products and/or technology areas associated with one or more entities.

FIG. 7 illustrates an example flow diagram of an example process for communicating with a language model interface to obtain products and/or technology areas associated with one or more entities.

FIG. 11 illustrates an example flow diagram of an example process for generating visual representations that are presented on a graph including a timeline on an x-axis and an indication of an IP asset filing volume on a y-axis.

DETAILED DESCRIPTION

Figure 1:
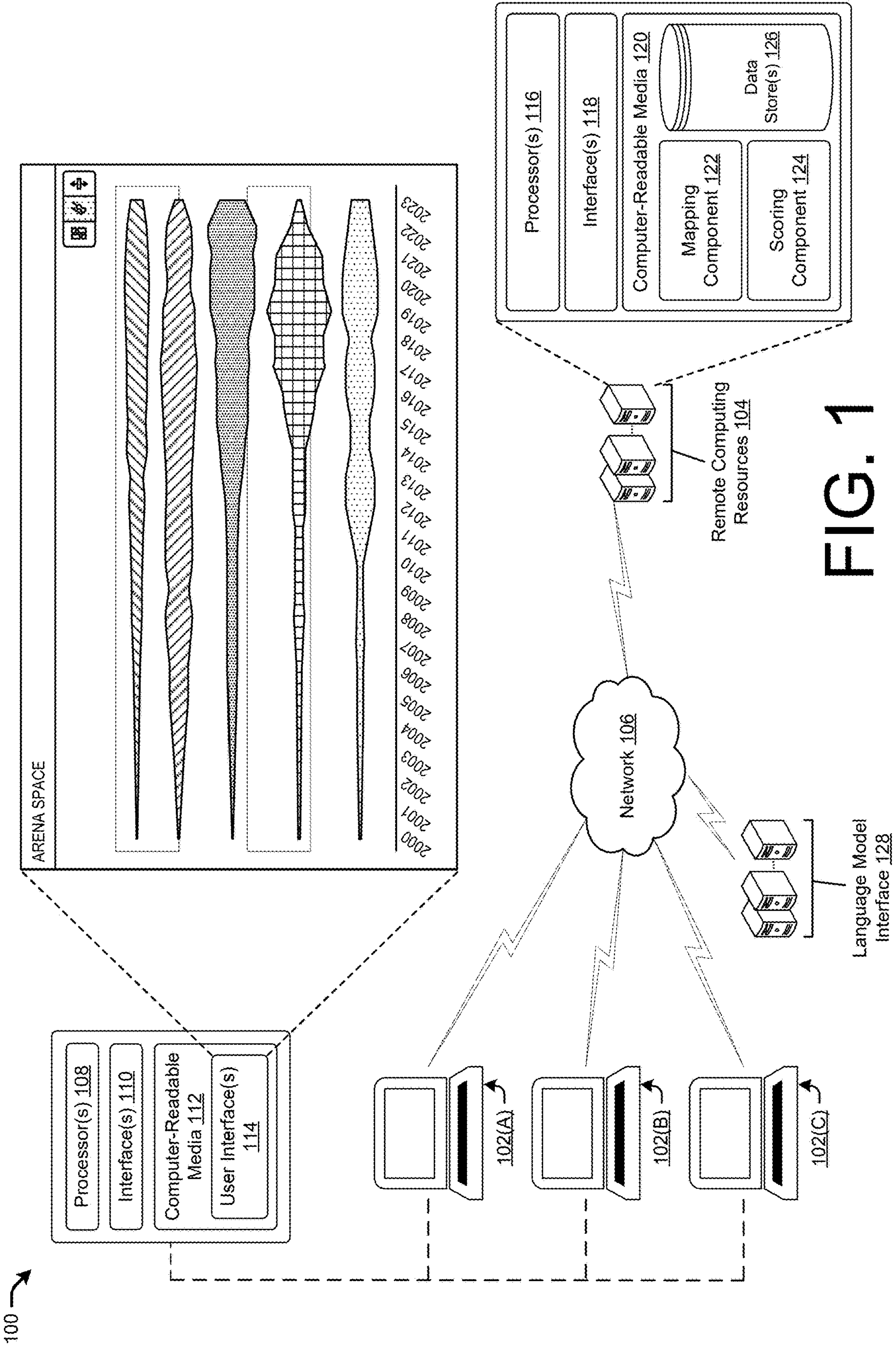
FIG. 1 illustrates a schematic diagram of an example environment for an IP mapping platform architecture.

Systems and methods for generation and use of an IP mapping platform are disclosed. Take, for example, an entity that would find it beneficial to utilize a platform to analyze a corpus of IP assets in an efficient manner to determine which IP assets are applicable to which products in a given marketplace. For example, an entity may have ownership, partial ownership, and/or otherwise be associated with a IP portfolio comprising a large number of IP assets that cover a variety of products and/or technology areas. The entity and/or a different entity (e.g., a competitor entity, an acquiring entity, etc.) may desire to know precisely which products and/or technology areas those IP assets cover and/or are otherwise associated with as well has how many of those IP assets are associated with each product and/or technology area. Currently, no database exits with a breakdown for products on the market into the technology components or spaces that make up that product. Similarly, no method exists for mapping those products and/or technologies to existing IP assets. Further, given the vast number of IP assets included in some IP portfolios (e.g., often in the thousands or tens of thousands), efficiently identifying the associated products and/or technology spaces as well as generating an understandable visual representation of the identified data (e.g., the associated products and/or technology space) can be challenging from both a design perspective as well as a computer processing perspective. This application discusses systems and methods for identifying products and/or technology areas associated with IP assets associated with an entity, performing additional analysis on the identified data (e.g., the entities, the IP assets, the products, the technology areas, etc.), as well as presenting the data in an easily consumable, informative, and interactive way.

In some examples discussed herein, a platform may communicate with a language model interface (e.g., a generative artificial intelligence (AI) engine) to obtain text descriptions of components and/or technologies that are used in products. Once the text descriptions are obtained, the platform may vectorize each text description and identify relevant IP assets based on a similarity value (e.g., cosine similarity value, Euclidean similarity value, etc.) between the vectorized text descriptions and vectorized text from the IP assets. For example, an entity may desire to know what IP assets exist in an IP asset portfolio and how those IP assets map to a product, a component of the product, a sub-component of the product, and/or a technology area for patentability determinations, for freedom to operate determination, for infringement determinations, for asset acquisition purposes, for research and development purposes, for insurance purposes, etc. In some cases, an entity may find it beneficial to utilize a platform to determine i) an overall coverage and/or identify gaps in coverage; ii) a potential market opportunity; iii) a potential exposure; and iv) an indication of an entities IP presence over a period of time associated with the products, the components, the sub-components, the technology areas, and/or IP assets. For example, an entity may desire to know a comprehensive breadth score, revenue alignment data, or supply chain relations ships associated with the IP assets associated with products, the components, the sub-components, the technology areas, and/or the IP assets for patentability determinations, for freedom to operate determinations, for infringement determinations, for asset acquisition purposes, for research and development purposes, for insurance purposes, and the like. Generally, a user may search a database of such documents using keyword searching, such as, for example, a technical term, a target product, or an identifier of a target entity. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. Additionally, grouping the patents into groupings based on one or more shared technical fields, subject matters, and/or by similar entities may become cumbersome, especially when dealing with a large corpus. In light of this, an IP mapping platform that is configured to communicate with a language model interface to determine technologies, components, and/or sub-components that are associated with a particular product, obtain text description of those technologies, components, and/or sub-components, vectorize those text descriptions, and identify IP assets that may be determined to be similar to the vectorized text descriptions.

Described herein is an IP mapping platform that is configured to identify one or more IP assets within an IP portfolio associated with an entity and identify one or more products, components, sub-components, and/or technology areas associated with each of the IP assets. In some cases, the IP mapping platform may identify other IP assets that are similar to the identified products and/or the technology areas. The platform may include a mapping component, a scoring component, and a data store. In some examples, the mapping component may include various sub-components, such as a search component, an AI interface component, a clustering component, and/or a user interface generation component. Additionally, or alternatively, the search component may include various sub-components, such as a similarity component, a vector component, and/or a ranking component. Generally, the mapping component may utilize any number of its components to vectorize text descriptions obtained from a language model interface (e.g., generate vector values), vectorize text included in IP assets, determine cosine similarity between one or more vectors, identify IP assets that are similar to the text descriptions (e.g., based on cosine similarity), determine revenue alignment associated with products and/or IP assets, identify entities having similar IP portfolios, and infer supply chain relationships. In some cases, the mapping component may utilize any number of its components to seed user driven IP searches, identify entities having similar IP portfolios, cluster IP assets with varying levels of granularity, and generate a spatial representation of the clusters of IP assets. The scoring component include various sub-components, such as a coverage component, an opportunity component, an exposure component, and a data store. In some examples, the coverage component may include various sub-components, such as a geographic distribution component, an expiration component, a comprehensive breadth score component, a diversity component, a revenue alignment component and/or an invalidity component. In some cases, the opportunity component may include various sub-components, such as a filing velocity component, a predictive analytics component, and/or a precedence component. In some examples, the exposure component may include various sub-component, such as a litigation campaign component and/or an alignment to exposure component. The datastore may be a secure datastore accessible by the system and utilized to securely store user account data including a project library, an IP asset library including one or more IP assets, and/or historical data. The IP mapping platform may be accessible to users via one or more user interfaces that may be configured to display information associated with project(s) associated with a user account of the user and/or one or more user account(s) associated with user account. Additionally, or alternatively, the user interface(s) may be configured to receive user input.

The IP mapping platform may be configured to display a user interface for presenting information associated with the project(s) associated with the user account. For example, the user interface may include selectable portions that when selected, may present information associated with the mapping component and or information associated with the scoring component. Additionally, or alternatively, the IP mapping platform may be configured to cause the user interface to present information associated with the mapping component and/or information associated with the scoring component using different views. Additionally, or alternatively, the user interface(s) may include one or more information windows for presenting information associated with the project(s) associated with the user account. In some cases, the information presented on the user interface may be selectable and the data included in the information may be utilized in additional analysis. For example, in cases where the user interface presents a flowchart illustrating a number of flows corresponding to different technology areas flowing out of a particular product, the user interface may enable the user to select an individual technology area (e.g., click on an individual flow) to be utilized for additional analysis. In some cases, the additional analysis may include identifying other IP assets that are similar to the selected technology area, identifying one or more competitor entities associated with the selected technology area, determine an IP asset count associated with the selected technology area, etc.

When a user accesses the IP mapping platform using a user account, the user interface may be caused to display one or more pages that present portions of the information associated with the mapping component and/or scoring component using information windows that are relevant to that page. Pages that may be accessed by a user account may include, for example, an interface usable to communicate with a language model interface. In some cases, the user interface may be caused to display one or more pages that present portions of the information associated with the coverage component, the opportunity component, and/or the exposure component using information windows that are relevant to that page.

As mentioned above, the IP mapping platform may include a datastore. In some examples, the datastore may include data corresponding to user accounts, projects, IP assets, historical data, saved results from previous interactions the user account has made with the IP mapping platform, and/or market data. The project(s) may include, for example, search queries, similarity results, etc. The project(s) may be stored with respect to the user account(s). Additionally, or alternatively, the saved result(s) may include, for example, search queries, similarity results, etc. The IP asset(s) may be stored with respect to an IP asset library. In some examples, the IP asset library may include data associated with IP assets and/or related to a corresponding IP asset, such as, for example, licensing data, and/or standard essential patent data. The historical data may be stored with respect to the user account(s) and/or independently in the data store(s). In some examples, the historical data may include historical data associated with an entity, a publication, an IP asset, and/or a user account. For example, the historical data may include data specific to mergers and acquisitions associated with a particular entity and/or IP asset. The market data may include market data associated with an entity, an IP asset, a technological area, a product and/or service, and/or standardized market data, and/or any other non-IP related data of the like.

As mentioned above, the IP mapping platform may include a mapping component utilized to generate search queries using vectorized text descriptions, identify IP assets and/or entities determined to be similar to the vectorized text descriptions, and/or make one or more determinations based on the identified IP assets and/or entities. In some cases, these determinations may include, i) how strong and/or weak is their IP asset portfolio for a particular technology and/or product relative to their competitors, and/or ii) an indication of an entities IP presence over a period of time associated with the technology areas and/or IP assets. In some examples, the mapping component may include one or more sub-components. For example, the mapping component may include a search component, a user interface generation component, a clustering component, and/or an AI interface component. In some examples, the mapping component may utilize the one or more sub-components to make determinations and/or generate data to be displayed on the user interface.

In some examples, the search component may include one or more sub-components. For example, the search component may include a similarity component, a vector component, and/or a ranking component. The search component may utilize the one or more sub-components to make determinations and/or to generate data to be displayed on the user interface. Additionally, or alternatively, the search component may be configured to generate search queries using user specified targeted data. For example, a user may specify one or more target entities, one or more target publications, one or more text descriptions, one or more target products, one or more target technologies (e.g., technology areas), one or more target sub-technologies, one or more target components, and/or one or more target sub-components that the search component may utilize to generate a search. The results of the search may include a listing of IP assets (e.g., an IP asset portfolio) that the similarity component has determined to include similarities to the targeted data.

In some examples, the similarity component may be configured to identify similarities between separate data. For example, given text description of target data (e.g., of a product, a technology, a sub-technology, a component, and/or a sub-component) received from a language model interface, the similarity component may be configured to identify one or more IP assets that are similar to the text description of the target data. In some examples, the similarity component may compare words included in a text portion of IP assets to determine the IP asset is similar to the text description of the target data. Additionally, or alternatively, the mapping component and/or similarity component may utilize any other word matching and/or document comparison techniques to determine if the IP assets are similar to the text description of the target data. Additionally, or alternatively, the similarity component may utilize the vector representations of IP assets and/or text descriptions of target data to determine if they are similar to one another. For example, the similarity component may generate a search strategy that may use a similarity measure, such as cosine similarity, to compare vector representations of the vectorized documents (e.g., the text descriptions and the IP assets). The most similar documents and/or documents having a similarity score above a predetermined threshold (e.g., 80% similar, 90% similar, etc.) can then be selected and provided to the user.

In some examples, the vector component may be configured to generate vector representations of text descriptions, IP assets, publications and/or entities. For example, the vector component may be configured to generate a vector representation of a text description, an IP asset, and/or a publication and use the vector representation to identify IP assets having similar vector representations to text descriptions and/or other IP assets. Techniques to generate vectors representing IP assets may include vectorization techniques such as Doc2Vec, or other similar techniques. Additionally, or alternatively, techniques to generate vectors representing text descriptions and/or IP assets may include a method that takes a document, such as an IP asset and/or a text description, and turns it into a vector form as a list of floating-point numbers based at least in part on the document's text contents. This vector form may be called an embedding. This embedding may be used to calculate distance, and therefore similarity, between documents. Additionally, or alternatively, the vector component may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

In some examples, the ranking component may be configured to rank the results of the search that may include a listing of IP assets that the similarity component has determined to include similarities to the targeted data (e.g., a product, a technology, a sub-technology, a component, and/or a sub-component). For example, the ranking component may compare the vector representations generated by the vector component to determine which IP assets are most similar to a product, a technology, a sub-technology, a component, and/or a sub-component (e.g., based on the text description of the product, the technology, the sub-technology, the component, and/or the sub-component) and rank the IP assets accordingly.

The user interface generation component may be configured to generate user interface element(s) and/or user interface pages described above using data received from other components utilized by the system. In some examples, the user interface generation component may be communicatively coupled to the other components stored thereon the computer-readable media. In some examples, the user interface generation component may generate user interfaces configured to present information associated with user projects associated with a user account. Additionally, or alternatively, the user interface generation component may generate user interfaces including confidential information and may be configured to be accessible by only users with predetermined qualifications. For example, the user interface generation component may cause only a portion of information to be displayed based on the type of account that is accessing the system. For example, when a user accesses the system, the system may determine that the account type of the account that the user has utilized to access the system may be one of, for example, a client user account and/or an administrative user account. In some examples, the user interface generation component may generate interactive graphical elements and/or dynamic animation sequences associated with the interactive graphical elements.

In some examples, the search component may be configured to receive data representing a search query and may perform a search operation in a number of ways. A search query may include one or more instances of target data as described in more detail below. In some examples, the search query may indicate an identification of one or more target entities, one or more target markets, and/or a request for a product list associated with the one or more target entities and/or target markets. Additionally, or alternatively, the search query may indicate an identification of one or more target publications, such as, for example, an IP asset. Additionally, or alternatively, the search query may indicate an identification of one or more target products and/or services. In some examples, the IP mapping platform may be configured to receive additional data associated with the search query. For example, the search component may be configured to receive additional data via one or more actionable elements included on a graphical user interface (GUI) presented on a computing device and accessible to a user account. Additionally, or alternatively, the search component may be configured to utilize the data representing a search query to make various identifications and determinations associated with IP assets and/or entities, among other things.

In response to receiving the search query, the search component may send a query to a language model interface for an answer to the search query. For instance, the search query may include an entity name associated with an entity, a target market, and/or a request for a product and/or technology area associated with the entity and/or the target market. The search component may forward the query, via an AI interface component, to the language model interface and in response, may receive a product list and/or a technology area that is associated with the entity and/or the target market. In some cases, the product list may be a breakdown of each product that the entity has sold and/or otherwise has made available for purchase. In some examples, the product list may be a breakdown of each product sold int the target market and/or otherwise is made available for purchase in the target market. In some cases, the technology areas may be a breakdown of each technology that is used to produce each product and/or is otherwise associated with each product. In some cases, the technology areas may include a sub-technology list that is associated with each technology included in the technology areas. In some cases, the sub-technology list may be a breakdown of each respective sub-technology that is used to produce each technology area and/or is otherwise associated with each technology area. In some examples, the text in the technology areas and the text in the sub-technology areas may not be in a format that is compatible for being mapped to one or more IP assets. The AI engine may be further configured to generate text descriptions of the respective technology areas and/or the sub-technology lists to enable the search component to vectorize the text descriptions in a format such that they can be compared to vectorized versions of IP assets. For example, the search component may receive text descriptions of a particular technology within the technology areas and/or the sub-technologies within the sub-technology lists from the language model interface and may vectorize the desired text descriptions.

For example, the search component may indicate the identification of the one or more text description, and the similarity component may utilize the data representing the text description to identify IP assets (or IP asset portfolios) that are determined to be similar to the text description. The similarity component may identify similar IP assets using various techniques. For example, the vector component may generate a vector representation of the text description(s) and use the vector representation to identify IP assets having similar vector representations. Techniques to generate vectors representing IP assets may include vectorization techniques, such as Doc2Vec or other similar techniques. Additionally, or alternatively, techniques to generate vectors representing IP assets may include a method that takes a document, such as an IP asset and/or a text description, and turns it into a vector form as a list of floating-point numbers based at least in part on the document's text contents. This vector form may be called an embedding. This embedding may be used to calculate distance, and therefore similarity, between documents. Each of the IP assets may be associated with an entity, and the search component may identify a particular entity (sometimes referred to as a competitor entity) from one or more entities associated with the similar IP assets. In some cases, the mapping component may be utilized to make one or more determinations based on the identified IP assets and/or entities. In some cases, these determinations may include, i) an overall coverage and/or identify gaps in coverage; ii) a potential market opportunity; iii) a potential exposure; and iv) an indication of an entities IP presence over a period of time associated with the products, the components, the sub-components, the technology areas, and/or IP assets.

In some cases, similarity component 218 may indicate that one or more other entities are operating in the same technology space as the specified target entity. For example, the similarity component 218 may identify a number of similar IP assets (e.g., IP assets that the IP mapping platform determines are associated with the technology area(s)) and an entity assigned to and/or otherwise associated with each similar IP asset. In some cases, the similarity component 218 may rank a number of other entities based on their IP presence in the technology area (e.g., the more IP assets associated with a technology area for a given entity may indicate a higher ranking). In some examples, once one or more other entities (sometimes referred to as a "competitor entity") are identified that operate in a given technology area, the IP mapping platform may perform a further search (e.g., query the language model interface) for the competitor entity to determine which products, technology areas, and/or sub-technology areas that the competitor entity is associated with. In some cases, the IP mapping platform may identify technology areas that the competitor entity operates in but that the target entity is not associated with and/or does not operate in.

For example, the IP mapping platform may perform a search using Car Company A as the target entity and may determine that one of the technology areas that Car Company A operates in and/or has an IP presence in is oil filters. The IP mapping platform may then identify (e.g., based on similarity search for similar IP assets to Oil Filters that exist) Car Company B as also operating in the oil filter technology space. Once Car Company B is identified, the IP mapping platform may identify other technology areas that Car Company B operates in (e.g., via querying a language model interface and/or by an analysis of IP assets that are associated with Car Company B). In some examples, the IP mapping platform may determine that a subset of the other technology areas that Car Company B operates in are not operated in by Car Company A. For example, Car Company B may specialize in autonomous vehicles and own a number of IP assets associated with motion detection devices. In some cases, the IP mapping platform may determine that Car Company A does not have any products that map to the motion detection technology area. In some cases, the IP mapping platform may determine that Company A has a marginal IP presence in motion detecting devices relative to Company B based on an analysis of IP assets that are associated with Car Company A and with Company B. In this way, the IP mapping platform may inform a user which technology areas Company A may not be operating in and/or have a weaker or stronger IP presence in relative to a competitor entity (e.g., Car Company B).

As mentioned above, the mapping component and/or user interface generation component may generate one or more graphical user interface(s) (GUIs) for presenting information on computing device(s) accessible by user accounts. In some examples, the IP mapping platform may generate a user interface for presenting the search results. The GUIs may be configured to receive one or more inputs from the computing device. In some examples, the GUI may receive an input representing a selection of at least one technology area included in the search results as one or more selected technology areas. In some examples, the mapping component and/or user interface generation component may be configured to generate any of the user interfaces described above.

As mentioned above, the IP mapping platform may include a scoring component that includes sub-components, such as a coverage component utilized to determine an overall coverage and/or identify gaps in coverage, an opportunity component utilized to determine a potential market opportunity, and an exposure component utilized to determine a potential exposure associated with the IP assets. In some examples, each of the coverage component, the opportunity component, and the exposure component may include one or more sub-components. In some examples, once the IP assets are identified by the mapping component that are determined to be similar (e.g., include a cosine similarity that is above a predefined threshold value) to the product, the technology area, and/or the sub-technology, the scoring component may perform additional analysis on the IP assets using the one or more sub-components of the scoring components.

For example, the coverage component may include various sub-components, such as a geographic distribution component, an expiration component, a comprehensive breadth score component, a diversity component, a revenue alignment component and/or an invalidity component. In some examples, the coverage component may utilize the one or more sub-components to make determinations and/or generate data to be displayed on the user interface. For example, each of the sub-components may generate a metric to be utilized by the coverage component to generate a coverage metric. In some examples, the coverage metric may be generated for an IP asset portfolio of an entity accessing the IP mapping platform, a sub-set of the IP asset portfolio (e.g., for a particular market and/or technology), an IP asset portfolio of another entity (e.g., business competitor) associated with the entity accessing the IP mapping platform, and/or a sub-set of the IP asset portfolio (e.g., for a particular market and/or technology) of the other entity. The coverage metric may indicate a comprehensive score indicating an IP coverage associated with the IP asset portfolio and/or a subset of the IP asset portfolio.

In some examples, the geographic distribution component may make determinations and/or generate data to be displayed on the user interface. For example, a user may specify one or more target entities, one or more target publications, and/or one or more target products that the geographic distribution component may utilize to generate a geographic distribution search. In some examples, the geographic distribution component may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component may determine which countries and/or regions the IP assets of the IP asset portfolio are filed for a given entity, market, and/or technology area. In some cases, the geographic distribution component may determine a metric based at least in part on which countries the IP assets are filed. For example, the geographic distribution component may determine a gross domestic product (GDP) value associated with each country and/or region in which an entity has filed IP assets. The geographic distribution component may generate a metric based on which countries and/or regions the IP assets are filed and the GDP of those respective countries and/or regions. In some cases, if a country that the IP assets are filed in have a higher GDP, the geographic distribution component may generate a positive metric. Additionally, and/or alternatively, if a country that the IP assets are filed in have a lower GDP, the geographic distribution component may generate a negative metric. In some examples, the metrics generated by the geographic distribution component may be used by the coverage component to generate a coverage metric.

In some examples, the expiration component may make determinations and/or generate data to be displayed on the user interface. For example, a user may specify one or more target entities, one or more target publications, and/or one or more target products that the expiration component may utilize to generate an expiration search. In some examples, the expiration component may be configured to identify one or more target entities utilizing data representing one or more target publications and/or one or more target products. The results of the expiration search may include determining a number and/or a breadth score associated with individual IP assets of an asset portfolio. In some cases, the expiration component may determine that a number of IP assets of an asset portfolio are about to expire and that a breadth score of these IP assets are high. In this case, the expiration component may generate a negative metric to be provide to the coverage component. Additionally, and/or alternatively, the expiration component may determine that a number of IP assets of an asset portfolio are about to expire and that a breadth score of these IP assets are low. In this case, the expiration component may generate a less negative metric to be provide to the coverage component.

In some examples, the comprehensive breadth score component may make determinations and/or generate data to be displayed on the user interface. For example, a user may specify one or more target entities, one or more target publications, and/or one or more target products that the comprehensive breadth score component may utilize to generate a comprehensive breadth search. In some examples, the comprehensive breadth score component may be configured to identify one or more target entities utilizing data representing one or more target publications and/or one or more target products. The results of the comprehensive breadth search may include a comprehensive breadth score for an IP asset portfolio of an entity accessing the IP mapping platform, a sub-set of the IP asset portfolio (e.g., for a particular market and/or technology), an IP asset portfolio of another entity (e.g., business competitor) associated with the entity accessing the IP mapping platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component may receive or otherwise identify a plurality of IP assets associated with an entity and calculate, for the individual IP assets of the plurality of IP assets, a breadth score based at least in part on a word count score and a commonness score for the respective portions of text included in the individual IP assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component may calculate a weighted score for the individual IP assets based on multiplying the breadth score by a weight that is determined by the respective breadth scores for the individual IP assets. For example, the comprehensive breadth score component may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component may calculate a comprehensive score for the group of IP assets by calculating an average of the weighted scores of the individual IP assets. In some examples, the comprehensive breadth score component may provide the comprehensive score for the group of IP assets to the coverage component to be used in calculating a coverage metric.

In some cases, the comprehensive breadth score component can calculate the comprehensive breadth score for a group of IP assets based on a market and/or technology area. In some examples, the comprehensive breadth score component can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, an IP asset that has expired, and an IP asset that has been abandoned and/or a breadth score for an IP asset that has changed.

In some examples, the diversity component may make determinations and/or generate data to be displayed on the user interface. For example, a user may specify one or more target entities, one or more target publications, and/or one or more target products that the diversity component may utilize to generate a diversity search. In some examples, the diversity component may be configured to identify one or more target entities utilizing data representing one or more target publications and/or one or more target products. The results of the diversity search may include a metric indicating how diversified a group of IP assets are over a given market and/or technology area.

In some examples, the revenue alignment component may make determinations and/or generate data to be displayed on the user interface. For example, a user may specify one or more target entities, one or more target publications, one or more target markets, and/or one or more target products that the revenue alignment component may utilize to generate a revenue alignment search. In some examples, the revenue alignment component may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component may identify one or more market areas and/or technology areas associated with an entity accessing the IP mapping platform. The revenue alignment component may identify revenue streams of the entity that are associate with the one or more market areas, one or more products sold by the entity, and/or one or more technology areas and identify a number of IP assets that are associated with the entity as well as the one or more technology areas, products, sub-technologies, components, and/or sub-components. In some cases, the revenue alignment component may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component may then generate an alignment metric based at least in part on the number of the IP assets associated with the one or more market areas and/or one or more technology areas and the one or more revenue streams associated with the one or more market areas and/or one or more technology areas. In some examples, the revenue alignment component may identify the market and/or technology areas by accessing a taxonomy of market sets and/or a taxonomy of technology areas provided by a third-party resource and/or stored on the database. In this way, the revenue alignment component may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component may also generate a metric illustrating a revenue alignment for multiple other entities. For example, the revenue alignment component may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component may illustrate a comparison of a revenue alignment metric associated with the entity to a revenue alignment metric associated with multiple other entities generating revenue and filing IP assets in an individual market area and/or technology area.

In some examples, the invalidity component may make determinations and/or generate data to be displayed on the user interface. For example, a user may specify one or more target entities, one or more target publications, and/or one or more target products that the invalidity component may utilize to generate a geographic distribution search. In some examples, the invalidity component may be configured to identify one or more target entities utilizing data representing one or more target publications and/or one or more target products. The results of the invalidity search may include citation data associated with a group of IP assets and/or individual IP assets associated with an entity accessing the IP mapping platform. In some cases, the invalidity component may generate an invalidity metric indicating a likelihood that an IP asset may be considered to be invalid if it were to be challenged in a court of law. In some cases, the invalidity component may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component may utilize any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some cases, the opportunity component may include various sub-components, such as a filing velocity component, a predictive analytics component, and/or a precedence component. In some examples, the opportunity component may utilize the one or more sub-components to make determinations and/or generate data to be displayed on the user interface. For example, each of the sub-components may generate a metric to be utilized by the opportunity component to generate an opportunity metric. In some examples, the opportunity metric may be generated for an IP asset portfolio of an entity accessing the IP mapping platform, a sub-set of the IP asset portfolio (e.g., for a particular market and/or technology), an IP asset portfolio of another entity (e.g., business competitor) associated with the entity accessing the IP mapping platform, and/or a sub-set of the IP asset portfolio (e.g., for a particular market and/or technology) of the other entity. The opportunity metric may indicate a potential market area and/or technology area opportunity associated with the IP asset portfolio and/or a subset of the IP asset portfolio.

In some examples, the filing velocity component may make determinations and/or generate data to be displayed on the user interface. For example, a user may specify one or more target entities, one or more target publications, and/or one or more target products that the filing velocity component may utilize to generate a filing velocity search. In some examples, the filing velocity component may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component may identify a total amount of IP assets filed that are directed towards or otherwise associated with a given market area and/or technology area for a period of time (e.g., a year, five years, ten years, etc.) The filing velocity component may then identify a number of IP assets filed by individual entities, such as an entity accessing the IP mapping platform and associated entity competitors, during that time period directed towards or otherwise associated with the market area and/or the technology area. In some examples, the filing velocity component may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area. In some cases, the filing velocity component may be used to predict future metrics associated with IP assets. For instance, the percentile ranking of an entity and/or technology area and/or an amount in which a number of filings has increased (e.g. a filing velocity) may be extrapolated by the filing velocity component into an upcoming time period. For example, if an entity has increased an amount of IP assets filed by 10% each year for the last 50 years and the entity filed 200 IP assets in the current year of 2023, the filing velocity component may predict that the entity will file a 10% increase for the year 2024 and file 220 IP assets for the year 2024. The same type of extrapolation can be applied to a given market and/or technology area. For instance, if a particular market and/or technology area has grown or shrunk (e.g., increased or decreased of associated IP asset filings) over a period of time by a determined amount of a determined period of time (e.g., 5% decrease over the last 75 years), then the filing velocity component may extrapolate that value and apply it to future periods of time to determine how the market and/or technology area may grow or shrink in the future.

In some cases, the term "future," as used herein may indicate a future date that has yet to come into existence (e.g., the time or a period of time following the moment of speaking or writing). In some examples, the term "future" may refer to a period of time in which there is no and/or not enough data (e.g., documentation) to be used in generating one or more determinations (e.g., metrics). For instance, in some cases, certain documents (e.g., patent applications) may not be made publicly available for a period of time (e.g., 18 months) after they are generated and/or filed with a particular entity (e.g., the United States Patent and Trademark Office (USPTO)). Thus, the IP mapping platform may generate predictions for determinations (e.g., metrics) based on the techniques discussed herein for the period of time in which no and/or not enough data exists, regardless of whether or not that period of time has come into existence or not. In some cases this period of time may be referred to as the "future," in the sense that the period of time post-dates a last date in which publicly available data exists. In some examples, the predicted data that is generated for the period of time in which the publicly available data does not exist may be referred to as an extrapolated data set.

In some examples, the filing velocity component may identify a total amount of IP assets filed that are directed towards or otherwise associated with an IP art unit and/or a patent classification for a period of time (e.g., a year, five years, ten years, etc.) The filing velocity component may then identify a number of IP assets filed by individual entities, such as an entity accessing the IP mapping platform and associated entity competitors, during that time period directed towards or otherwise associated with the IP art unit. In some examples, the filing velocity component may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component may make determinations and/or generate data to be displayed on the user interface. For example, a user may specify one or more target entities, one or more target publications, and/or one or more target products that the predictive analytics component may utilize to generate a predictive analytics search. In some examples, the predictive analytics component may be configured to identify one or more target entities utilizing data representing one or more target publications and/or one or more target products. The results of the predictive analytics search may include a predicted comprehensive breadth score for a pending IP asset associated with an entity. For example, the predictive analytics component may determine an examiner and/or an art unit associated with at least one pending IP asset filed or otherwise associated with the entity. In some cases, the predictive analytics component may determine a comprehensive breadth score, as discussed herein, for at least one originally filed claim of an IP asset (e.g., application) previously examined by the examiner and/or previously filed in the art unit. The predictive analytics component may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component may determine an effect that a particular examiner and/or art unit may have on a comprehensive breadth score of a potentially allowable claim. For example, the predictive analytics component may determine predicted breadth score for a pending IP asset based at least in part on the examiner metric and/or the art unit metric. In some cases, the predicted breadth score may be utilized by the opportunity component to generate the opportunity metric.

In some cases, the predictive analytics component may generate a predicted issue date for a pending IP asset associated with an entity based on an average length of prosecution associated with an examiner and/or an art unit. In some cases, the predicted issue date may be utilized by the opportunity component to generate the opportunity metric.

In some examples, the precedence component may make determinations and/or generate data to be displayed on the user interface. For example, a user may specify one or more target entities, one or more target publications, and/or one or more target products that the precedence component may utilize to generate a precedence search. In some examples, the precedence component may be configured to identify one or more target entities utilizing data representing one or more target publications and/or one or more target products. The results of the precedence search may include metric data indicating a historical precedence associated with an IP asset. For example, the precedence component may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component determines a precedence metric, the precedence metric may be provided to the opportunity component and utilized to generate the opportunity metric.

In some examples, the exposure component may include various sub-component, such as a litigation campaign component and/or an alignment to exposure component. In some examples, the exposure component may utilize the one or more sub-components to make determinations and/or generate data to be displayed on the user interface. For example, each of the sub-components may generate a metric to be utilized by the exposure component to generate an exposure metric. In some examples, the exposure metric may be generated for an IP asset portfolio of an entity accessing the IP mapping platform, a sub-set of the IP asset portfolio (e.g., for a particular market and/or technology), an IP asset portfolio of another entity (e.g., business competitor) associated with the entity accessing the IP mapping platform, and/or a sub-set of the IP asset portfolio (e.g., for a particular market and/or technology) of the other entity. The exposure metric may indicate a potential exposure and/or risk (e.g. potential risk of litigation) associated with a market area and/or technology area associated with the IP asset portfolio and/or a subset of the IP asset portfolio. In some examples, the exposure component may identify the levels of exposure associated with the result sets and/or IP assists associated with an entity, and may aggregate the data indicating the levels of exposure associated with the result sets and/or IP asset to determine an overall level of exposure for an entity. In some examples, the exposure assessment component may be utilized in combination with any of the components described above. Additionally, or alternatively, the exposure component may make determinations and/or generate data to be displayed on the user interface.

In some examples, the litigation campaign component may make determinations and/or generate data to be displayed on the user interface. For example, a user may specify one or more target entities, one or more target publications, and/or one or more target products that the litigation campaign component may utilize to generate a litigation campaign search. In some examples, the litigation campaign component may be configured to identify one or more target entities utilizing data representing one or more target publications and/or one or more target products. The results of the litigation campaign search may include data indicating a potential likelihood of litigation associated with a particular market area and/or technology area. For example, the litigation campaign component may identify a litigation campaign associated with a market area and/or technology area by determining that an entity has filed at least two cases associated with the market area and/or technology area within the same calendar year. Once the litigation campaign component determines that the at least two cases are part of a litigation campaign directed towards a particular market area and/or technology area, the litigation campaign component may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation campaign component may obtain litigation data (e.g., defendant information, plaintiff information, case filing information, etc.) from a third party resource and may store the data in the database. In some cases, the data generated by the litigation campaign component may be provided to the exposure component and utilized to generate an exposure metric.

In some examples, the alignment to exposure component may make determinations and/or generate data to be displayed on the user interface. For example, a user may specify one or more target entities, one or more target publications, and/or one or more target products that the alignment to exposure component may utilize to generate an alignment to exposure search. In some examples, the alignment to exposure component may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component may determine a market area and/or technology area associated with a group of IP assets filed and/or otherwise associated with an entity, such as an entity utilizing the IP mapping platform. The alignment to exposure component may then identifying a litigation history (e.g., past litigation and current litigation) associated with the technology area and/or market area. In some cases, if there is a large amount of litigation associated with the market area and/or technology area, the alignment to exposure component may determine that the group of IP assets are at a greater risk of litigation. Additionally, and/or alternatively, if there is a small amount of litigation associated with the market area and/or technology area, the alignment to exposure component may determine that the group of IP assets are at a lesser risk of litigation. In some cases, the data generated by the alignment to exposure component may be provided to the exposure component and utilized to generate an exposure metric.

In some cases, the alignment to exposure component may be utilized to determine supply chain relationships for a given entity. For example, once the IP assets are identified by the mapping component that are determined to be similar (e.g., include a cosine similarity that is above a predefined threshold value) to the product, the technology, the sub-technology, the components, and/or the sub-components, the alignment to exposure component may determine which portions of the components of the entities products are being developed in house and which components are being sourced from somewhere else. For instance, if the entity has a large IP asset presence in a first particular technology and/or sub-technology while having a little or no IP asset presence in a second particular technology and/or sub-technology, then the alignment to exposure component may determine that the entity produces the first particular technology and/or sub-technology while sourcing the second particular technology and/or sub-technology from elsewhere.

In some examples, the scoring component may utilize the coverage component, the opportunity component, the exposure component, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component may be configured to receive data representing a search query and may perform a search operation in a number of ways and provide data and/or metrics to the various other components and sub-components discussed herein. A search query may include one or more instances of target data as described in more detail below. In some examples, the search query may indicate an identification of one or more target entities. Additionally, or alternatively, the search query may indicate an identification of one or more target publications, such as, for example, an IP asset. Additionally, or alternatively, the search query may indicate an identification of one or more target products and/or services. In some examples, the IP mapping platform may be configured to receive additional data associated with the search query. For example, the scoring component may be configured to receive additional data via one or more actionable elements included on a GUI presented on a computing device and accessible to a user account. Additionally, or alternatively, the scoring component may be configured to utilize the data representing a search query to make various identifications and determinations associated with IP assets and/or entities, among other things.

In some examples, the search query may indicate the identification of the one or more target entities, and the scoring component may utilize the data to identify IP assets that are associated with the target entity. In some examples, the scoring component may access one or more database(s) including a listing of all of the available IP assets associated with the target entity (e.g., an IP asset portfolio). Additionally, or alternatively, the scoring component may generate a result set including IP assets having an assignee associated with the entity.

Additionally, or alternatively, the search query may indicate the identification of the one or more target publications may utilize the data representing the search query to identify IP assets (or IP asset portfolios) that are determined to be similar to the target data. The scoring component may identify similar IP assets using various techniques. For example, the scoring component may generate a vector representation of the target publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for an IP mapping platform architecture. The architecture 100 may include, for example, one or more user devices 102(*a*)-(*c*), also described herein as electronic devices 102(*a*)-(*c*), and/or a remote computing resources 104 associated with a mapping platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

By way of example, the user interface(s) 114 may include one or more of the user interfaces described elsewhere herein, such as the user interfaces described with respect to FIGS. 3-7, corresponding to a flowchart interface, an IP asset filing interface, and/or 3-D cluster user interface, etc. It should be understood that while the user interface(s) 114 are depicted as being a component of the computer-readable media 112 of the electronic devices 102(*a*)-(*c*), the user interface(s) 114 may additionally or alternatively be associated with the remote computing resources 104. The user interface(s) 114 may be configured to display information associated with the IP mapping platform and to receive user input associated with the IP mapping platform.

The remote computing resources 104 may include one or more components such as, for example, one or more processors 116, one or more network interfaces 118, and/or computer-readable media 120. The computer-readable media 120 may include one or more components, such as, for example, a mapping component 122, a scoring component 124, and/or one or more data store(s) 126. The mapping component 122 may be configured to receive user input data as described herein for indicating target data representing at least one of an entity, publication, a technology area, a market, and/or product utilized to generate search queries that utilize the target data to communicate with a language model interface 128 to receive return results including a product list, a technology area list, a sub-technology list, a component list, a sub-component list, and/or a text description. The mapping component 122 may then identify IP assets that are determined to be similar to the technology areas and/or text descriptions received from the language model interface 128. The mapping component 122 may also be configured to generate vector representations of the entities and/or IP assets such that the mapping component 122 may rank the results from the search query by utilizing vector representations. The mapping component 122 may also be configured to generate an interactive graphical element, that may be configured to respond to various user inputs representing manipulations to the interactive graphical element, for presenting a spatial representation of the one or more clusters included in a selected result set.

The scoring component 124 may be configured to communicate with the mapping component 122 to receive user input data as described herein for indicating target data representing at least one of an entity, publication, a technology area, a market, and/or product utilized to generate search queries that utilize the target data to determine a representative entity and return results including IP assets associated with the representative entity and/or one or more entities that have IP assets that are determined to be similar to the IP assets of the representative entity. The scoring component 124 may be configured to communicate with the mapping component 122 to generate vector representations of the entities and/or IP assets such that the scoring component 124 may rank and/or otherwise analyze the results from the search query by utilizing vector representations. The scoring component 124 may also be configured to utilize the vector representations of the entities and/or the IP assets associated with the entities to generate result sets including comprehensive breadth scores, revenue alignment metrics, IP asset filing metrics, and/or litigation campaign metrics associated with the technical fields, products or technologies of interest, IP assets associated with particular market areas and/or technical areas, etc. The scoring component 124 may also be configured to generate an interactive graphical element, that may be configured to respond to various user inputs representing manipulations to the interactive graphical element, for presenting a spatial representation of the one or more metrics included in a selected result set.

The data store(s) 126 of the remote computing resources 104 may include data corresponding to user accounts, user projects, historical data, and/or IP assets The user projects may include, for example, search queries, similar entity and/or publication results, and/or the spatial representation results. The user projects may be stored with respect to the user account of the data store 126. The IP assets may be stored with respect to an IP asset library of the data store 126.

As shown in FIGS. 2A and 2B, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface(s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2A illustrates a component diagram of example components 200 of a remote computing resource 104 for the IP mapping platform. The remote computing resource 104 may include one or more components such as, for example, one or more processor(s) 116, one or more network interfaces 118, and/or computer-readable media 120. The computer-readable media may include one or more components, such as, for example, a mapping component 122, an scoring component 124, and/or one or more data stores 126 (illustrated at FIG. 2B). Some or all of the components and functionalities may be configured to communicate with each other.

As mentioned with respect to FIG. 1, the mapping component 122 may be configured to receive user input data as described herein for indicating target data representing at least one of an entity, publication, a technology area, a market, and/or product utilized to generate search queries that utilize the target data to communicate with a language model interface 128 to receive return results including a product list, a technology area list, a sub-technology list, a component list, a sub-component list, and/or a text description. The mapping component 122 may then identify IP assets that are determined to be similar to text descriptions and/or the technology areas received from the language model interface 128. The mapping component 122 may also be configured to generate vector representations of the entities and/or IP assets such that the mapping component 122 may rank the results from the search query by utilizing vector representations. The mapping component 122 may also be configured to generate an interactive graphical element, that may be configured to present the target data (e.g., an entity name), the technology area list, the sub-technology list, the component list, the sub-component list, and/or the text description as well as respond to various user inputs representing manipulations to the interactive graphical element. In some cases, the various user inputs may result in presenting a spatial representation of one or more clusters included in a selected result set. The mapping component 122 may include one or more components, such as, for example, a search component 212, a user interface generation component 214, clustering component 258, and/or an AI interface component 216. Additionally, or alternatively, the mapping component 122 may be configured to perform the operations described below with respect to the one or more components.

The search component 212 may include one or more components, such as, for example, a similarity component 218, a vector component 220, and/or a ranking component 222. The search component 212 may be configured to generate search queries using user specified targeted data. For example, one or more target entities, one or more target publications, one or more text descriptions, one or more target products, one or more target technologies, one or more target sub-technologies, one or more target components, and/or one or more target sub-components may be utilized by the search component 212 to generate a search. The results of the search may include a listing of IP assets (e.g., an IP asset portfolio) that the similarity component 218 has determined to include similarities to the targeted data as well as the entities associated with those IP assets (e.g., the assignees of the IP assets).

The similarity component 218 may be configured to identify similarities between separate data. For example, given text description of target data (e.g., of a product, a technology, a sub-technology, a component, and/or a sub-component) received from a language model interface, the similarity component 218 may be configured to identify one or more IP assets that are similar to the text description of the target data. In some examples, the similarity component 218 may compare words included in a text portion of IP assets to determine the IP asset is similar to the text description of the target data. Additionally, or alternatively, the mapping component 122 and/or similarity component 218 may utilize any other word matching and/or document comparison techniques to determine if the IP assets are similar to the text description of the target data. Additionally, or alternatively, the similarity component 218 may utilize the vector representations of IP assets and/or text descriptions of target data to determine if they are similar to one another. For example, the similarity component 218 may generate a search strategy that may use a similarity measure, such as cosine similarity, to compare vector representations of the vectorized documents (e.g., the text descriptions and the IP assets). The most similar documents and/or documents having a similarity score above a predetermined threshold (e.g., 80% similar, 90% similar, etc.) can then be selected and provided to the user.

The vector component 220 may be configured to generate vector representations of text descriptions, IP assets, publications and/or entities. For example, the vector component 220 may be configured to generate a vector representation of a text description, an IP asset, and/or a publication and use the vector representation to identify IP assets having similar vector representations to text descriptions and/or other IP assets. Techniques to generate vectors representing IP assets may include vectorization techniques such as Doc2Vec, or other similar techniques. Additionally, or alternatively, techniques to generate vectors representing text descriptions and/or IP assets may include a method that takes a document, such as an IP asset and/or a text description, and turns it into a vector form as a list of floating-point numbers based at least in part on the document's text contents. This vector form may be called an embedding. This embedding may be used to calculate distance, and therefore similarity, between documents. Additionally, or alternatively, the vector component 220 may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

The ranking component 222 may be configured to rank the results of the search that may include a listing of IP assets that the similarity component 218 has determined to include similarities to the targeted data (e.g., a product, a technology area, a sub-technology, a component, and/or a sub-component). For example, the ranking component 222 may compare the vector representations generated by the vector component 220 to determine which IP assets are most similar to a product, a technology area, a sub-technology, a component, and/or a sub-component (e.g., based on the text description of the product, the technology, the sub-technology, the component, and/or the sub-component) and rank the IP assets accordingly. In some cases, the ranking component 222 may identify the entities associated with each IP asset and rank each entity based on a number of IP assets that each entity is associated with (e.g., the more IP assets associated with an entity the higher the ranking). In some cases, the ranking component 222 may generate an acquisition score associated with each entity and rank the entities based on the acquisition score. For example, the acquisition score may indicate an acquisition strength for each entity be based on the IP assets associated with each entity. For a given target entity, if the entities to be acquired are associated with IP assets in a technology area that the target entity lacks IP assets for, this may increase their acquisition score. Alternatively, if the entities to be acquired are associated with IP assets in a technology area that the target entity has many IP assets for, this may decrease their acquisition score.

In some examples, the search component 212 may be configured to receive data representing a search query and may perform a search operation in a number of ways. A search query may include one or more instances of target data as described in more detail below. In some examples, the search query may indicate an identification of one or more target entities, one or more target markets, and/or a request for a product list associated with the one or more target entities and/or target markets. Additionally, or alternatively, the search query may indicate an identification of one or more target publications, such as, for example, an IP asset. Additionally, or alternatively, the search query may indicate an identification of one or more target products and/or services. In some examples, the IP mapping platform may be configured to receive additional data associated with the search query. For example, the search component 212 may be configured to receive additional data via one or more actionable elements included on a GUI presented on a computing device and accessible to a user account. Additionally, or alternatively, the search component 212 may be configured to utilize the data representing a search query to make various identifications and determinations associated with IP assets and/or entities, among other things.

In response to receiving the search query, the search component 212 may send a query to a language model interface for an answer to the search query. For instance, the search query may include an entity name associated with an entity, a target market, and/or a request for a product and/or technology area associated with the entity and/or the target market. The search component 212 may forward the query, via an AI interface component 216, to the language model interface 128 and in response, may receive a product list and/or a technology area that is associated with the entity and/or the target market. In some cases, the product list may be a breakdown of each product that the entity has sold and/or otherwise has made available for purchase. In some examples, the product list may be a breakdown of each product sold int the target market and/or otherwise is made available for purchase in the target market. In some cases, the technology areas may be a breakdown of each technology that is used to produce each product and/or is otherwise associated with each product. In some cases, the technology areas may include a sub-technology list that is associated with each technology included in the technology areas. In some cases, the sub-technology list may be a breakdown of each respective sub-technology that is used to produce each technology area and/or is otherwise associated with each technology area. In some examples, the text in the technology areas and the text in the sub-technology areas may not be in a format that is compatible for being mapped to one or more IP assets. The language model interface 128 may be further configured to generate text descriptions of the respective technology areas and/or the sub-technology lists to enable the search component 212 to vectorize the text descriptions in a format such that they can be compared to vectorized versions of IP assets. For example, the search component 212 may receive text descriptions (e.g., in response to a request for text descriptions) of a particular technology within the technology areas and/or the sub-technologies within the sub-technology lists from the language model interface 128 and may vectorize the desired text descriptions.

For example, the search component 212 may indicate the identification of the one or more text description, and the similarity component 218 may utilize the data representing the text description to identify IP assets (or IP asset portfolios) that are determined to be similar to the text description. The similarity component 218 may identify similar IP assets using various techniques. For example, the vector component 220 may generate a vector representation of the text description(s) and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset and/or a text description, and turns it into a vector form as a list of floating-point numbers based at least in part on the document's text contents. This vector form may be called an embedding. This embedding may be used to calculate distance, and therefore similarity, between documents. Each of the IP assets may be associated with an entity, and the search component 212 may identify a particular entity (sometimes referred to as a competitor entity) from one or more entities associated with the similar IP assets. In some cases, the mapping component 122 may be utilized to make one or more determinations based on the identified IP assets and/or entities. In some cases, these determinations may include, i) an overall coverage and/or identify gaps in coverage; ii) a potential market opportunity; iii) a potential exposure; and iiii) an indication of an entities IP presence over a period of time associated with the products, the components, the sub-components, the technology areas, and/or IP assets.

In some cases, similarity component 218 may indicate that one or more other entities are operating in the same technology space as the specified target entity. For example, the similarity component 218 may indicate a number of similar IP assets (e.g., IP assets that the IP mapping platform determines are associated with the technology area(s)) and an entity assigned to and/or otherwise associated with each similar IP asset. In some cases, the similarity component 218 may indicate may rank a number of other entities based on their IP presence in the technology area (e.g., the more IP assets associated with a technology area for a given entity may indicate a higher ranking). In some examples, once one or more other entities (sometimes referred to as a "competitor entity") are identified that operate in a given technology area, the mapping component 122 may perform a further search (e.g., query the language model interface 128) for the competitor entity to determine which products, technology areas, and/or sub-technology areas that the competitor entity is associated with. In some cases, the mapping component 122 may identify technology areas that the competitor entity operates in but that the target entity is not associated with and/or does not operate in.

The user interface generation component 214 may be configured to generate user interface element(s), window(s), page(s), and/or view(s) described below with respect to FIGS. 3-7 using data received from other components utilized by the IP mapping platform. In some examples, the user interface generation component 214 may be communicatively coupled to the other components stored thereon the computer-readable media 120. In some examples, the user interface generation component 214 may generate user interfaces configured to present information associated with user account data 202, project data 204, and/or saved results 224. Additionally, or alternatively, the user interface generation component 214 may generate user interfaces including confidential information and may be configured to be accessible by only users with predetermined qualifications. For example, the user interface generation component 214 may cause only a portion of information to be displayed based on the type of account that is accessing the platform. For example, when a user accesses the system, the user interface generation component 214 may determine that the account type of the account that the user has utilized to access the system may be one of, for example, an internal user and/or an external user, and may only include a portion of the information to be displayed that is associated with that account type. In some examples, the user interface generation component 214 may generate notifications to send to the user accounts.

The clustering component 258 may be configured to generate result sets including one or more clusters of IP assets. In some examples, the clustering component 258 may generate multiple result sets including any number of clusters from 1-N, where N is any integer larger than 1. In some examples, the result sets may be associated with varying levels of granularity. For example, a result set having 2 clusters may be less granular than a result set having 20 clusters. In some examples, the clustering component 258 may generate result sets using a vector form described above, such as, for example, the embedding. As mentioned above, the embedding may be used to calculate distance, and therefore similarity, between documents. The clustering component 258 may also utilize the embeddings to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

In some examples, as mentioned above, the result sets generated by the clustering component 258 may be associated with varying levels of granularity. In some examples, the varying levels of granularity may be achieved by utilizing various cluster specific techniques to assign IP assets into clusters, as described with more detail below. In some examples, hard clustering assignments may be made on IP assets where the cluster assignment by the system is uncertain. Additionally, or alternatively, IP assets that have an uncertain cluster assignment may be grouped with other IP assets that have an uncertain cluster assignment. Additionally, or alternatively, for each IP asset, its probability of belonging to every cluster may be calculated. In some examples, a vector may be generated representing the probabilities of its membership to every cluster. In some examples, this process may be repeated until the IP asset reaches a threshold probability of belonging to at least one of the clusters. Additionally, or alternatively, the IP asset may be assigned to a cluster in which the IP asset has the highest probability of belonging to. Additionally, or alternatively, an IP asset not belonging to a cluster may include very low probabilities of belonging to each of the clusters, and may be identified as a singleton IP asset, and/or may be identified as a novel IP asset among the IP assets included in the clusters. Additionally, or alternatively, user input may be provided to guide the assignment of an IP asset into a cluster grouping. In some examples, one or more models that are associated with the result sets may be saved in association with a user account such that the saved models may be applied later to new IP assets considered for cluster assignment.

The mapping component 122 may also be configured to receive input data representing user input indicating an identification of a target entity. In some examples, the mapping component 122 may also be configured to identify one or more IP assets 206 that are associated with a target entity. For example, the mapping component 122 may be configured to identify IP assets 206 in the IP asset library 210 that are associated with a target entity. Additionally, or alternatively, the mapping component 122 may also be configured to receive input data representing user input indicating an identification of a target publication, such as, for example, a target IP asset 206. In some examples, the mapping component 122 may be configured to identify the target entity based on the target publication. In some examples, the mapping component 122 and/or similarity component 218 may be configured to identify one IP assets that are similar to a target publication (e.g., text description) as a target IP asset. For example, the mapping component 122 may determine that the target IP asset has a similarity score with the target publication that satisfies a threshold value. Additionally, or alternatively, the mapping component 122 and/or similarity component 218 may be configured to identify a set of IP assets that are similar to a set of target publications, as a target publication. Additionally, or alternatively, the mapping component 122 may also be configured to receive input data representing user input indicating an identification of a target product and/or service. In some examples, the mapping component 122 may be configured to identify a technical categorization of the target product and may identify one or more IP assets that are associated with the technological categorization of the target product as a target IP asset.

As mentioned above with respect to FIG. 1, the scoring component 124 may be configured to communicate with the mapping component 122 to receive user input data as described herein for indicating target data representing at least one of an entity, publication, a technology area, a market, and/or product utilized to generate search queries that utilize the target data to determine a representative entity and return results including one or more IP assets associated with the representative entity, one or more entities that have IP assets that are determined to be similar to the target data, market area and/or technology areas associated with the IP assets of the representative entity, revenue data associated with the market area and/or technology areas of the representative entity, revenue data associated with one or more entities that have IP assets that are determined to be similar to the IP assets of the representative entity, and/or litigation data associated with market area and/or technology areas associated with the IP assets of the representative entity. The scoring component 124 may also be configured to communicate with the mapping component 122 to generate vector representations of the entities and/or IP assets such that the scoring component 124 may rank the results from the search query by utilizing vector representations. The scoring component 124 may also be configured to communicate with the mapping component 122 to utilize the vector representations of the entities to generate result sets including metrics of selected entities associated with technical fields, IP assets, products or technologies of interest, etc. The scoring component 124 may also be configured to generate an interactive graphical element, that may be configured to respond to various user inputs representing manipulations to the interactive graphical element, for presenting a spatial representation of the one or more metrics included in a selected result set. The scoring component 124 may include one or more components, such as a coverage component 228 utilized to determine an overall coverage and/or identify gaps in coverage, an opportunity component 230 utilized to determine a potential market opportunity, and an exposure component 232 utilized to determine a potential exposure associated with the IP assets. In some examples, each of the coverage component 228, the opportunity component 230, and the exposure component 232 may include one or more sub-components.

For example, the coverage component 228 may include various sub-components, such as a geographic distribution component 234, an expiration component 236, a comprehensive breadth score component 238, a diversity component 240, a revenue alignment component 242 and/or an invalidity component 244. In some examples, the coverage component 228 may utilize the one or more sub-components to make determinations and/or generate data to be displayed on the user interface. For example, each of the sub-components may generate a metric to be utilized by the coverage component 228 to generate a coverage metric. In some cases, the opportunity component 230 may include various sub-components, such as a filing velocity component 246, a predictive analytics component, 232 and/or a precedence component 250. In some examples, the opportunity component 230 may utilize the one or more sub-components to make determinations and/or generate data to be displayed on the user interface. For example, each of the sub-components may generate a metric to be utilized by the opportunity component 230 to generate an opportunity metric. In some examples, the exposure component 232 may include various sub-component, such as a litigation component 252 and/or an alignment to exposure component 254. In some examples, the exposure component 232 may utilize the one or more sub-components to make determinations and/or generate data to be displayed on the user interface. For example, each of the sub-components may generate a metric to be utilized by the exposure component 232 to generate an exposure metric. Additionally, or alternatively, the scoring component 124 may be configured to perform the operations described below with respect to the one or more components.

In some examples, the geographic distribution component 234 may make determinations and/or generate data to be displayed on the user interface. For example, a user may specify one or more target entities, one or more target publications, and/or one or more target products that the geographic distribution component 234 may utilize to generate a geographic distribution search. In some examples, the geographic distribution component 234 may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component 234 may determine which countries and/or regions the IP assets of the IP asset portfolio are filed for a given entity, market, and/or technology area. In some cases, the geographic distribution component 234 may determine a metric based at least in part on which countries the IP assets are filed. For example, the geographic distribution component 234 may determine a gross domestic product (GDP) value associated with each country and/or region in which an entity has filed IP assets. The geographic distribution component 234 may generate a metric based on which countries and/or regions the IP assets are filed and the GDP of those respective countries and/or regions. In some cases, if a country that the IP assets are filed in have a higher GDP, the geographic distribution component 234 may generate a positive metric. Additionally, and/or alternatively, if a country that the IP assets are filed in have a lower GDP, the geographic distribution component 234 may generate a negative metric. In some examples, the metrics generated by the geographic distribution component 234 may be used by the coverage component 228 to generate a coverage metric.

In some examples, the expiration component 236 may make determinations and/or generate data to be displayed on the user interface. For example, a user may specify one or more target entities, one or more target publications, and/or one or more target products that the expiration component 236 may utilize to generate an expiration search. In some examples, the expiration component 236 may be configured to identify one or more target entities utilizing data representing one or more target publications and/or one or more target products. The results of the expiration search may include determining a number and/or a breadth score associated with individual IP assets of an asset portfolio. In some cases, the expiration component 236 may determine that a number of IP assets of an asset portfolio are about to expire and that a breadth score of these IP assets are high. In this case, the expiration component 236 may generate a negative metric to be provide to the coverage component 228. Additionally, and/or alternatively, the expiration component 236 may determine that a number of IP assets of an asset portfolio are about to expire and that a breadth score of these IP assets are low. In this case, the expiration component 236 may generate a less negative metric to be provide to the coverage component 228.

In some examples, the comprehensive breadth score component 238 may make determinations and/or generate data to be displayed on the user interface. For example, a user may specify one or more target entities, one or more target publications, and/or one or more target products that the comprehensive breadth score component 238 may utilize to generate a comprehensive breadth search. In some examples, the comprehensive breadth score component 238 may be configured to identify one or more target entities utilizing data representing one or more target publications and/or one or more target products. The results of the comprehensive breadth search may include a comprehensive breadth score for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component 238 may receive or otherwise identify a plurality of IP assets associated with an entity and calculate, for the individual IP assets of the plurality of IP assets, a breadth score based at least in part on a word count score and a commonness score for the respective portions of text included in the individual IP assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component 238 may calculate a weighted score for the individual IP assets based on multiplying the breadth score by a weight that is determined by the respective breadth scores for the individual IP assets. For example, the comprehensive breadth score component 238 may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component 238 may calculate a comprehensive score for the group of IP assets by calculating an average of the weighted scores of the individual IP assets. In some examples, the comprehensive breadth score component 238 may provide the comprehensive score for the group of IP assets to the coverage component 228 to be used in calculating a coverage metric.

In some cases, the comprehensive breadth score component 238 can calculate the comprehensive breadth score for a group of IP assets based on a market and/or technology area. In some examples, the comprehensive breadth score component 238 can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, an IP asset that has expired, and an IP asset that has been abandoned and/or a breadth score for an IP asset that has changed.

In some examples, the diversity component 240 may make determinations and/or generate data to be displayed on the user interface. For example, a user may specify one or more target entities, one or more target publications, and/or one or more target products that the diversity component 240 may utilize to generate a diversity search. In some examples, the diversity component 240 may be configured to identify one or more target entities utilizing data representing one or more target publications and/or one or more target products.

The results of the diversity search may include a metric indicating how diversified a group of IP assets are over a given market and/or technology area.

In some examples, the revenue alignment component 242 may make determinations and/or generate data to be displayed on the user interface. For example, a user may specify one or more target entities, one or more target publications, one or more target markets, and/or one or more target products that the revenue alignment component 242 may utilize to generate a revenue alignment search. In some examples, the revenue alignment component 242 may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component 242 may identify one or more market areas and/or technology areas associated with an entity accessing the IP analysis platform. The revenue alignment component 242 may identify revenue streams of the entity that are associate with the one or more market areas and/or one or more technology areas and identify a number of IP assets that are associated with the entity as well as the one or more technology areas. In some cases, the revenue alignment component 242 may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component 242 may then generate an alignment metric based at least in part on the number of the IP assets associated with the one or more market areas and/or one or more technology areas and the one or more revenue streams associated with the one or more market areas and/or one or more technology areas. In some examples, the revenue alignment component 242 may identify the market and/or technology areas by accessing a taxonomy of market sets and/or a taxonomy of technology areas provided by a third-party resource and/or stored on the database. In this way, the revenue alignment component 242 may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component 242 may also generate a metric illustrating a revenue alignment for multiple other entities. For example, the revenue alignment component 242 may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component 242 may illustrate a comparison of a revenue alignment metric associated with the entity to a revenue alignment metric associated with multiple other entities generating revenue and filing IP assets in an individual market area and/or technology area.

In some examples, the invalidity component 244 may make determinations and/or generate data to be displayed on the user interface. For example, a user may specify one or more target entities, one or more target publications, and/or one or more target products that the invalidity component 244 may utilize to generate a geographic distribution search. In some examples, the invalidity component 244 may be configured to identify one or more target entities utilizing data representing one or more target publications and/or one or more target products. The results of the invalidity search may include citation data associated with a group of IP assets and/or individual IP assets associated with an entity accessing the IP analysis platform. In some cases, the invalidity component 244 may generate an invalidity metric indicating a likelihood that an IP asset may be considered to be invalid if it were to be challenged in a court of law. In some cases, the invalidity component 244 may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component 228 may utilize (e.g., aggregate) any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some examples, the filing velocity component 246 may make determinations and/or generate data to be displayed on the user interface. For example, a user may specify one or more target entities, one or more target publications, and/or one or more target products that the filing velocity component 246 may utilize to generate a filing velocity search. In some examples, the filing velocity component 246 may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component 246 may identify a total amount of IP assets filed that are directed towards or otherwise associated with a given market area and/or technology area for a period of time (e.g., a year, five years, ten years, etc.) The filing velocity component 246 may then identify a number of IP assets filed by individual entities, such as an entity accessing the IP analysis platform and associated entity competitors, during that time period directed towards or otherwise associated with the market area and/or the technology area. In some examples, the filing velocity component 246 may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component 230 to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area. In some examples, the filing velocity component 246 may determine a threshold percentile (e.g., 50%) in which the filing velocity component 246 may compare the percentile ranking of the entity (e.g., based on the number of IP assets filed by the entity) to in order to determine how the percentile ranking may affect the opportunity metric. For example, a percentile ranking of the entity being below the threshold percentile may indicate that an entity is underperforming with regard to a number of IP assets filed in a particular market area and/or technology area. Additionally, and/or alternatively, a percentile ranking of the entity being above the threshold percentile may indicate that an entity is overperforming with regard to a number of IP assets filed in a particular market area and/or technology area.

In some examples, the filing velocity component 246 may identify a total amount of IP assets filed that are directed towards or otherwise associated with an IP art unit for a period of time (e.g., a year, five years, ten years, etc.) The filing velocity component 246 may then identify a number of IP assets filed by individual entities, such as an entity accessing the IP analysis platform and associated entity competitors, during that time period directed towards or otherwise associated with the IP art unit. In some examples, the filing velocity component 246 may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component 230 to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component 248 may make determinations and/or generate data to be displayed on the user interface. For example, a user may specify one or more target entities, one or more target publications, and/or one or more target products that the predictive analytics component 248 may utilize to generate a predictive analytics search. In some examples, the predictive analytics component 248 may be configured to identify one or more target entities utilizing data representing one or more target publications and/or one or more target products. The results of the predictive analytics search may include a predicted comprehensive breadth score for a pending IP asset associated with an entity. For example, the predictive analytics component 248 may determine an examiner and/or an art unit associated with at least one pending IP asset filed or otherwise associated with the entity. In some cases, the predictive analytics component 248 may determine a comprehensive breadth score, as discussed herein, for at least one originally filed claim of an IP asset (e.g., application) previously examined by the examiner and/or previously filed in the art unit. The predictive analytics component 248 may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component 248 may determine an effect that a particular examiner and/or art unit may have on a comprehensive breadth score of a potentially allowable claim. For example, the predictive analytics component 248 may determine predicted breadth score for a pending IP asset based at least in part on the examiner metric and/or the art unit metric. In some cases, the predicted breadth score may be utilized by the opportunity component 230 to generate the opportunity metric.

In some cases, the predictive analytics component 248 may generate a predicted issue date for a pending IP asset associated with an entity based on an average length of prosecution associated with an examiner and/or an art unit. In some cases, the predicted issue date may be utilized by the opportunity component 230 to generate the opportunity metric.

In some examples, the precedence component 250 may make determinations and/or generate data to be displayed on the user interface. For example, a user may specify one or more target entities, one or more target publications, and/or one or more target products that the precedence component 250 may utilize to generate a precedence search. In some examples, the precedence component 250 may be configured to identify one or more target entities utilizing data representing one or more target publications and/or one or more target products. The results of the precedence search may include metric data indicating a historical precedence associated with an IP asset. For example, the precedence component 250 may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component 250 determines a precedence metric, the precedence metric may be provided to the opportunity component 230 and utilized to generate the opportunity metric.

In some cases, the opportunity component 230 may utilize (e.g., aggregate) any metric generated by the various sub-components to generate an opportunity metric associated with a group of IP assets associated with an entity and/or other entities.

In some examples, the litigation component 252 may make determinations and/or generate data to be displayed on the user interface. For example, a user may specify one or more target entities, one or more target publications, and/or one or more target products that the litigation component 252 may utilize to generate a litigation campaign search. In some examples, the litigation component 252 may be configured to identify one or more target entities utilizing data representing one or more target publications and/or one or more target products. The results of the litigation campaign search may include data indicating a potential likelihood of litigation associated with a particular market area and/or technology area. For example, the litigation component 252 may identify a litigation campaign associated with a market area and/or technology area by determining that an entity has filed at least two cases associated with the market area and/or technology area within the same calendar year. Once the litigation component 252 determines that the at least two cases are part of a litigation campaign directed towards a particular market area and/or technology area, the litigation component 252 may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation component 252 may obtain litigation data (e.g., defendant information, plaintiff information, case filing information, etc.) from a third party resource and may store the data in the database. In some cases, the data generated by the litigation component 252 may be provided to the exposure component 232 and utilized to generate an exposure metric.

In some examples, the alignment to exposure component 254 may make determinations and/or generate data to be displayed on the user interface. For example, a user may specify one or more target entities, one or more target publications, and/or one or more target products that the alignment to exposure component 254 may utilize to generate an alignment to exposure search. In some examples, the alignment to exposure component 254 may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component 254 may determine a market area and/or technology area associated with a group of IP assets filed and/or otherwise associated with an entity, such as an entity utilizing the IP analysis platform. The alignment to exposure component 254 may then identifying a litigation history (e.g., past litigation and current litigation) associated with the technology area and/or market area. In some cases, if there is a large amount of litigation associated with the market area and/or technology area, the alignment to exposure component 254 may determine that the group of IP assets are at a greater risk of litigation. Additionally, and/or alternatively, if there is a small amount of litigation associated with the market area and/or technology area, the alignment to exposure component 254 may determine that the group of IP assets are at a lesser risk of litigation. In some cases, the data generated by the alignment to exposure component 254 may be provided to the exposure component 232 and utilized to generate an exposure metric.

In some cases, the alignment to exposure component may be utilized to determine supply chain relationships for a given entity. For example, once the IP assets are identified by the mapping component that are determined to be similar (e.g., include a cosine similarity that is above a predefined threshold value) to the product, the technology, the sub-technology, the components, and/or the sub-components, the alignment to exposure component may determine which portions of the components of the entities products are being developed in house and which components are being sourced from somewhere else. For instance, if the entity has a large IP asset presence in a first particular technology and/or sub-technology while having a little or no IP asset presence in a second particular technology and/or sub-technology, then the alignment to exposure component may determine that the entity produces the first particular technology and/or sub-technology while sourcing the second particular technology and/or sub-technology from elsewhere.

In some examples, the scoring component 124 may utilize data received from and/or metrics generated by the coverage component 228, the opportunity component 230, the exposure component 232, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component 124 may be configured to receive data representing a search query and may perform a search operation in a number of ways and provide data and/or metrics to the various other components and sub-components discussed herein. A search query may include one or more instances of target data. In some examples, the search query may indicate an identification of one or more target entities. Additionally, or alternatively, the search query may indicate an identification of one or more target publications, such as, for example, an IP asset. Additionally, or alternatively, the search query may indicate an identification of one or more target products and/or services. In some examples, the IP analysis platform may be configured to receive additional data associated with the search query. For example, the scoring component 124 may be configured to receive additional data via one or more actionable elements included on a GUI presented on a computing device and accessible to a user account. Additionally, or alternatively, the scoring component 124 may be configured to utilize the data representing a search query to make various identifications and determinations associated with IP assets and/or entities, among other things.

In some cases, a machine learning (ML) component 256 may be configured to train one or more ML model(s) using machine-learning mechanisms. For example, a machine-learning mechanism can analyze historical data 208, market data 226, and/or any other type of data stored or otherwise accessible by the data store 126, associated with one or more entities, technology spaces, and/or markets, configured as training data to train a data model that creates an output, which can be a recommendation, a score, a respective probability, a threshold probability, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in the data store(s) 126 associated with remote computing resources 104 for use at a time after the data models have been trained (e.g., at runtime). Additionally, or alternatively, in at least one example, the machine-learning mechanisms may include an extreme gradient boosting (XGBoost) ML algorithm, a multi-layered perception ML algorithm, a random forest ML algorithm, and/or the like. In some examples, an innovation metric may be generated using at least one ML model trained by the machine learning component 256 based on company data associated with historical data 208, market data 226, and/or any other type of data stored or otherwise accessible by the data store 126, associated with one or more entities, technology spaces, and/or markets, configured as training data.

Once the ML model(s) are trained by the machine learning component 256, the ML model(s) may output an innovation metric for a given entity, technology space, and/or market. In some examples, the innovation metric may be a percentage ranging from 0% to 100%, such as with the percentile innovation metric discussed herein. Additionally and/or alternatively, the innovation metric output by the ML model(s) may include a normalized innovation metric, as discussed herein, indicating an integer value difference from a mean innovation metric from a group of innovation metrics of similar entities, technology spaces, and/or markets.

FIG. 2B illustrates another component diagram of example components 200 of a remote computing resource 104 for the IP mapping platform. The remote computing resource 104 may include one or more components such as, for example, one or more processor(s) 116 (illustrated at FIG. 2A), one or more network interfaces 118 (illustrated at FIG. 2A), and/or computer-readable media 120 (illustrated at FIG. 2A). The computer-readable media may include one or more components, such as, for example, a mapping component 122 (illustrated at FIG. 2A), an scoring component 124 (illustrated at FIG. 2A), and/or one or more data stores 126. Some or all of the components and functionalities may be configured to communicate with each other.

The data store(s) 126 may include data corresponding to user account(s) 202, project(s) 204, IP asset(s) 206(1)-(N), historical data 208, saved result(s) 224 from previous interactions the user account has made with the IP mapping platform, and/or market data 226. The project(s) 204 may include, for example, search queries, similarity results, clustering results, and/or spatial representations of clusters. The project(s) 204 may be stored with respect to the user account(s) 202. Additionally, or alternatively, the saved result(s) 224 may include, for example, search queries, similarity results, clustering results, and/or spatial representations of clusters. The IP asset(s) 206(1)-(N) may be stored with respect to an IP asset library 210. In some examples, the IP asset library 210 may include data associated with IP assets and/or related to a corresponding IP asset, such as, for example, licensing data, and/or standard essential patent data. The historical data 208 may be stored with respect to the user account(s) 202 and/or independently in the data store(s) 126. In some examples, the historical data 208 may include historical data associated with an entity, a publication, an IP asset 206, and/or a user account 202. For example, the historical data 208 may include data specific to mergers and acquisitions associated with a particular entity and/or IP asset 206. The market data 226 may include market data associated with an entity, an IP asset 206, a technological area, a product and/or service, standardized market data, and/or any other non-IP related data.

Figure 3A:
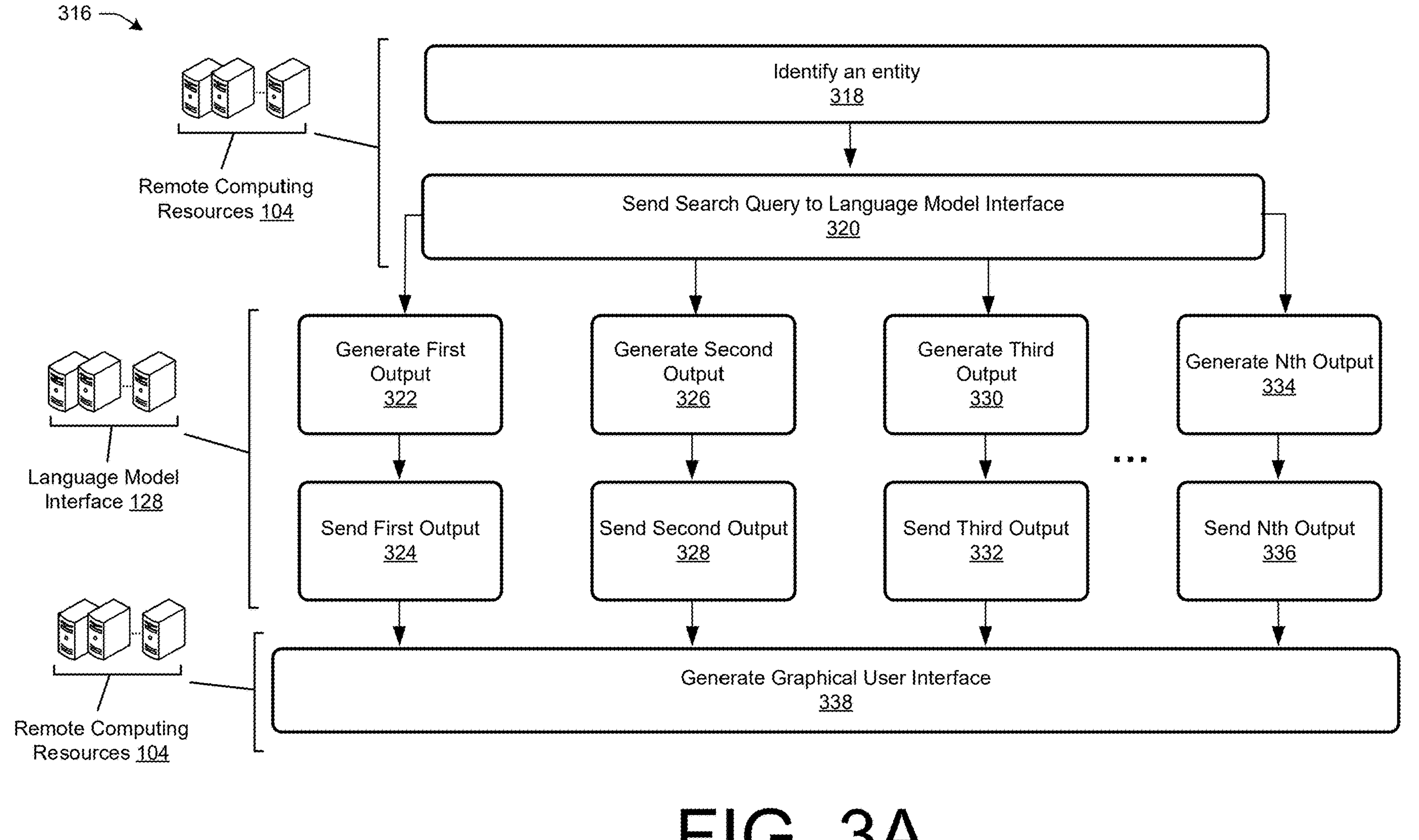
FIG. 3A illustrates an example flow diagram of an example process for generating a graphical user interface.

FIG. 3A illustrates an example process associated with the IP mapping platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures and systems.

FIG. 3A illustrates an example flow diagram of an example process 316 that includes communicating with a language model interface to obtain outputs (e.g., products and/or technology areas) associated with one or more entities. The order in which the operations or steps are described is not intended to be construed as a limitation, and any number of the described operations may be combined in any order and/or in parallel to implement process 316. The operations described with respect to the process 316 are described as being performed by an electronic device and/or a remote computing resource associated with the IP mapping platform. However, it should be understood that some or all of these operations may be performed by some or all of components, devices, and/or systems described herein.

At block 318, the process 316 may include identifying an entity associated with one or more IP assets.

At block 320, the process 316 may include sending a search query to a language model interface, such as the language model interface 128. In some examples, the search query may include a request for one or more products associated with the entity.

At block 322, the process 316 may include the language model interface 128 generating a first output. In some examples, the first output may include one or more products associated with the entity.

At block 324, the process 316 may include the language model interface 128 sending the first output to the remote computing resource 104. In some examples, this may include providing the one or more products to the remote computing resource 104.

At block 326, the process 316 may include the language model interface 128 generating a second output. In some examples, the second output may include one or more technology areas associated with the products associated with the entity.

At block 328, the process 316 may include the language model interface 128 sending the second output to the remote computing resource 104. In some examples, this may include providing the one or more technology areas to the remote computing resource 104.

At block 330, the process 316 may include the language model interface 128 generating a third output. In some examples, the third output may include one or more other entities that are similar to the identified entity, are associated with the technology area, and/or sell products that are the same and/or are similar to the identified products.

At block 332, the process 316 may include the language model interface 128 sending the third output to the remote computing resource 104.

At block 334, the process 316 may include the language model interface 128 generating an "Nth" output. At block 334, "N" represents any number of outputs that may be generated by the language interface 128.

At block 336, the process 316 may include the language model interface 128 sending the "Nth" output to the remote computing resource 104. In some examples, once all of the outputs generated by the language model interface 128 have been generated and sent to the remote computing resource 104, the remote computing resource 104 may generate an output representative of the outputs, such as, but not limited to, a flow diagram.

At block 338, the process 316 may include generating a GUI displayed on a computing device. In some cases, the GUI may include a flowchart including an entity name associated with the entity, the one or more products, and the one or more technology areas, wherein the flowchart illustrates the entity name mapped to the one or more products and the one or more products mapped to the one or more technology areas via a number of flows.

As illustrated by the process 316, block 322, block 326, block 330, and block 334 illustrate a series of work flows being performed by the language model interface 128 in response to the search query being sent by the remote computing resource 104 at block 320. In some cases, the workflows being performed by the language model interface 128 may be performed in parallel such that each output is generated and/or sent to the remote computing resource 104 simultaneously.

Figure 3B:
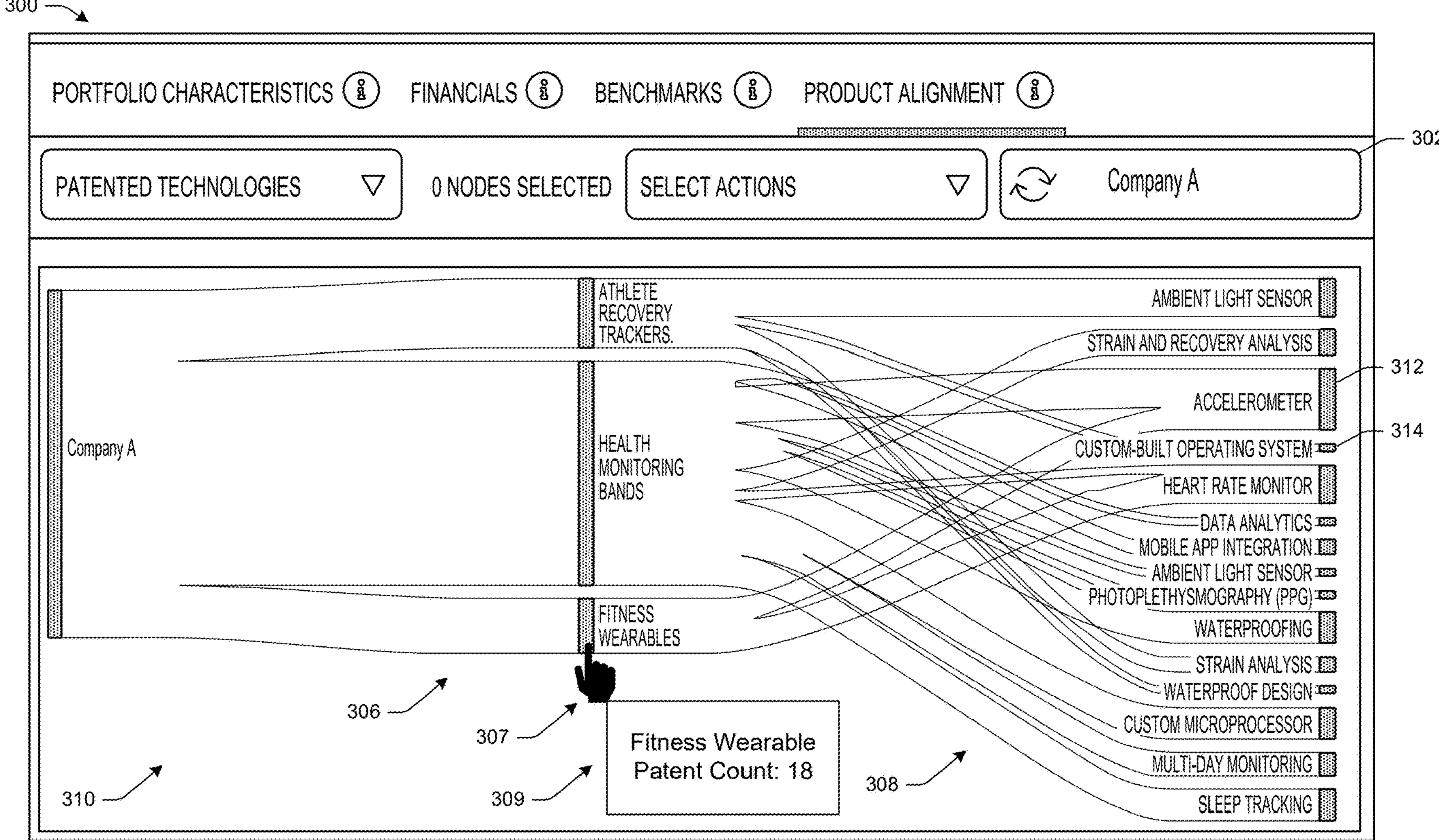
FIG. 3B illustrates an example an example user interface for displaying a flowchart associated with an entity.

FIGS. 3B-5 illustrate conceptual diagrams of example user interface(s) 300-500 that may receive user input and utilize the IP mapping platform to perform the various operations described above with respect to FIGS. 1, 2A, 2B and/or the various operations described below with respect to FIGS. 6-10. The user interface(s) 300-500 may be generated by the user interface generation component 214 described with respect to FIGS. 2A and 2B above. The user interface(s) 300-500 may be displayed on a display of an electronic device associated with a user account, such as the electronic device 102 as described with respect to FIG. 1 above. While example user interface(s) 300-500 are shown in FIGS. 3-5, the user interface(s) 300-500 are not intended to be construed as a limitation, and the user interface(s) 300-500 may be configured to present any of the data described herein.

FIG. 3B illustrates an example user interface 300 configured to present data associated with a user account representing user created IP mapping research, project(s) and/or project(s) associated with a user account. In some examples, the search component may be configured to receive data representing a search query and may perform a search operation in a number of ways. For instance, the interface 300 may include an input section 302. A search query may indicate an identification of a target entity (e.g., "Company A.") in the input section 302 and a request for a technology area breakdown. Additionally and/or alternatively, the search query may include one or more target markets, and/or a request for a product list associated with the one or more target entities and/or target markets. Additionally, or alternatively, the search query may indicate an identification of one or more target publications, such as, for example, an IP asset. Additionally, or alternatively, the search query may indicate an identification of one or more target products and/or services. In some examples, the IP mapping platform may be configured to receive additional data associated with the search query. For example, the search component may be configured to receive additional data via one or more actionable elements included on a GUI presented on a computing device and accessible to a user account. Additionally, or alternatively, the search component may be configured to utilize the data representing a search query to make various identifications and determinations associated with IP assets and/or entities, among other things.

In response to receiving the search query, the search component may send a query to a language model interface for an answer to the search query. For instance, the search query may include the entity name associated with an entity, a target market, and/or the request for the product list associated with the entity and/or technology areas associated with the products. The search component may forward the query, via an AI interface component, to the language model interface and in response, may receive a product list 306 (e.g., "Athlete Recovery Trackers," "Health Monitoring Bands," and "Fitness Wearables") that is associated with the entity and/or the target market and the technology areas 308 associated with the individual products include in the product list 306. In some cases, the product list 306 may be a breakdown of each product that the entity has sold and/or otherwise has made available for purchase. In some examples, the product list 306 may be a breakdown of each product sold int the target market and/or otherwise is made available for purchase in the target market. As illustrated by in user interface 300, the search component 212 may be configured to generate the flowchart 310 illustrating how the products map to the entity and how the technology areas map to the respective products. In some cases, the width of the flow may indicate an amount of IP presence that the target entity and/or or the competitor entity has in a particular target entity. For example, the flowchart 310 includes a flow 312 having a first width and a flow 314 having a second width that is less than the first width. This may indicate to the user that the entity has more IP assets directed to the technology area associated with the flow 312 than with the flow 314.

In some cases, the user interface 300 is presented in response to a user input selection of a selectable option which causes the user interface 300 to display an opportunity flowchart. For example, the similarity component 218 may indicate that one or more other entities are operating in the same technology space as the specified target entity. For example, the similarity component 218 may identify a number of similar IP assets (e.g., IP assets that the IP mapping platform determines are associated with the technology area(s) presented in the flowchart 310) and an entity assigned to and/or otherwise associated with each similar IP asset. In some cases, the similarity component 218 may rank a number of other entities based on their IP presence in the technology area (e.g., the more IP assets associated with a technology area for a given entity may indicate a higher ranking). In some examples, once one or more other entities (sometimes referred to as a "competitor entity") are identified that operate in a given technology area, the IP mapping platform may perform a further search (e.g., query the language model interface) for the competitor entity to determine which products, technology areas, and/or sub-technology areas that the competitor entity is associated with. In some cases, the IP mapping platform may identify technology areas that the competitor entity operates in but that the target entity is not associated with and/or does not operate in. Once these other technology areas are identified, the user interface 300 may display the other technology areas as flows within the opportunity flowchart to illustrate to the user which target area flows the target entity operates in and which target area flows the target entity does not operate in. In some cases, the width of the flow may indicate an amount of IP presence that the target entity and/or or the competitor entity has in a particular target entity.

In some cases, the user interface 300 may present one or more IP assets associated with an entity (e.g., Company A). For instance, the user interface 300 may include an icon 307 usable to select one or more items on the user interface 300. In some examples, the icon 307 may be used to select the product list 306 and in response, the user interface 300 may present a window 309 that may indicate a number of IP assets associated with a particular product list (e.g., Fitness Wearables). In other examples, the icon 307 may be used to select the entity (e.g., Company A) and/or any individual flow (e.g., flow 312 and/or flow 314) to request an IP asset count associated with the entity and/or the individual flows. For example, the mapping component 122 may be utilized to identify IP assets (e.g., from the IP asset library 210) that are similar to and/or otherwise associated with (e.g., via the search component 212, the similarity component 218, the vector component 220, and/or the ranking component 222) the entity, the products listed in the products list 306, and/or the flows. In this way, a user may utilized the user interface 300 to identify a number of technology areas and/or products associated with an entity as well as the IP assets associated with the entity that map to each technology area and/or product.

Figure 4A:
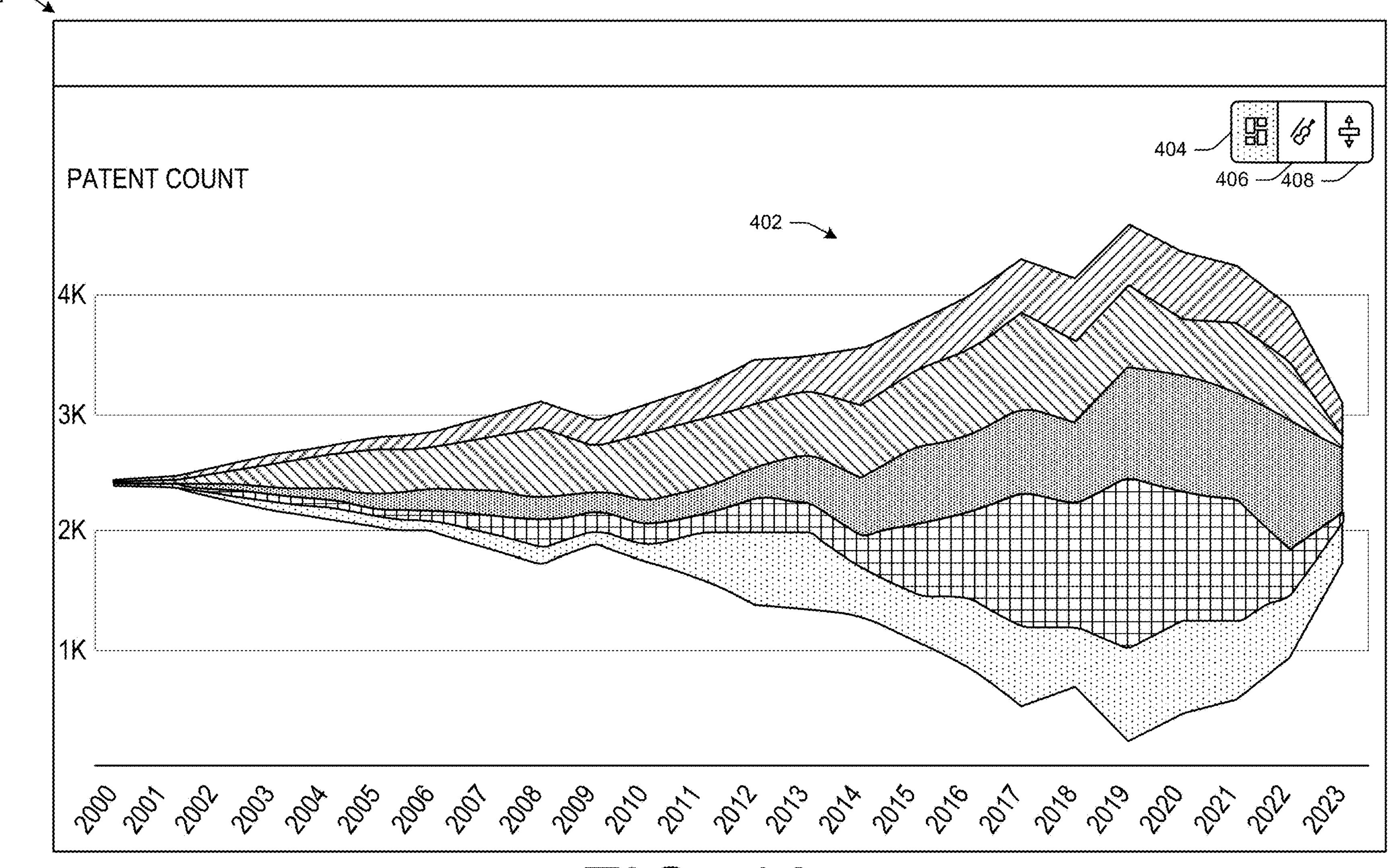
FIG. 4A illustrates an example user interface for displaying IP asset filing counts associated with multiple entities.
Figure 4B:
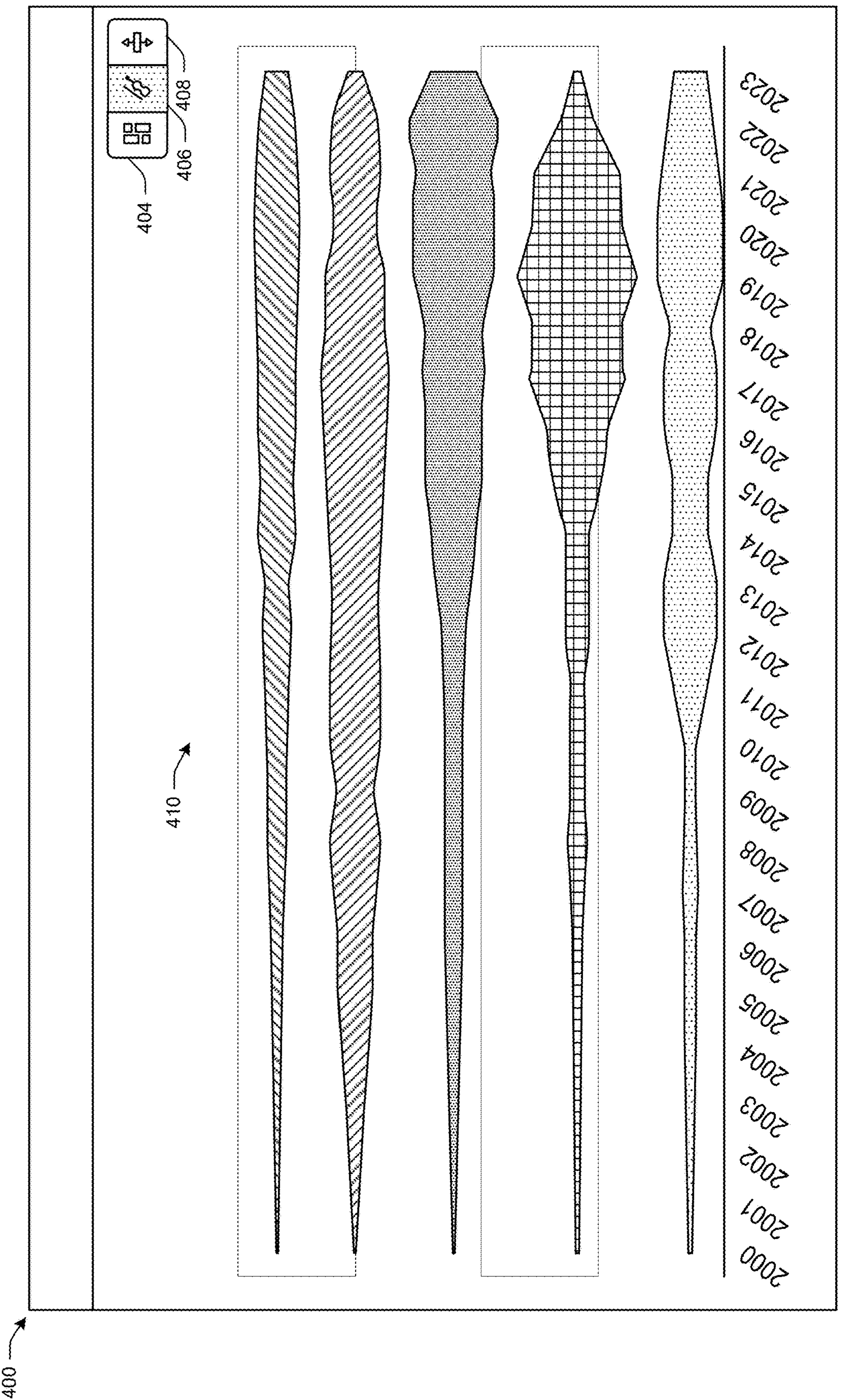
FIG. 4B illustrates an example user interface for displaying IP asset filing counts associated with multiple entities.
Figure 4C:
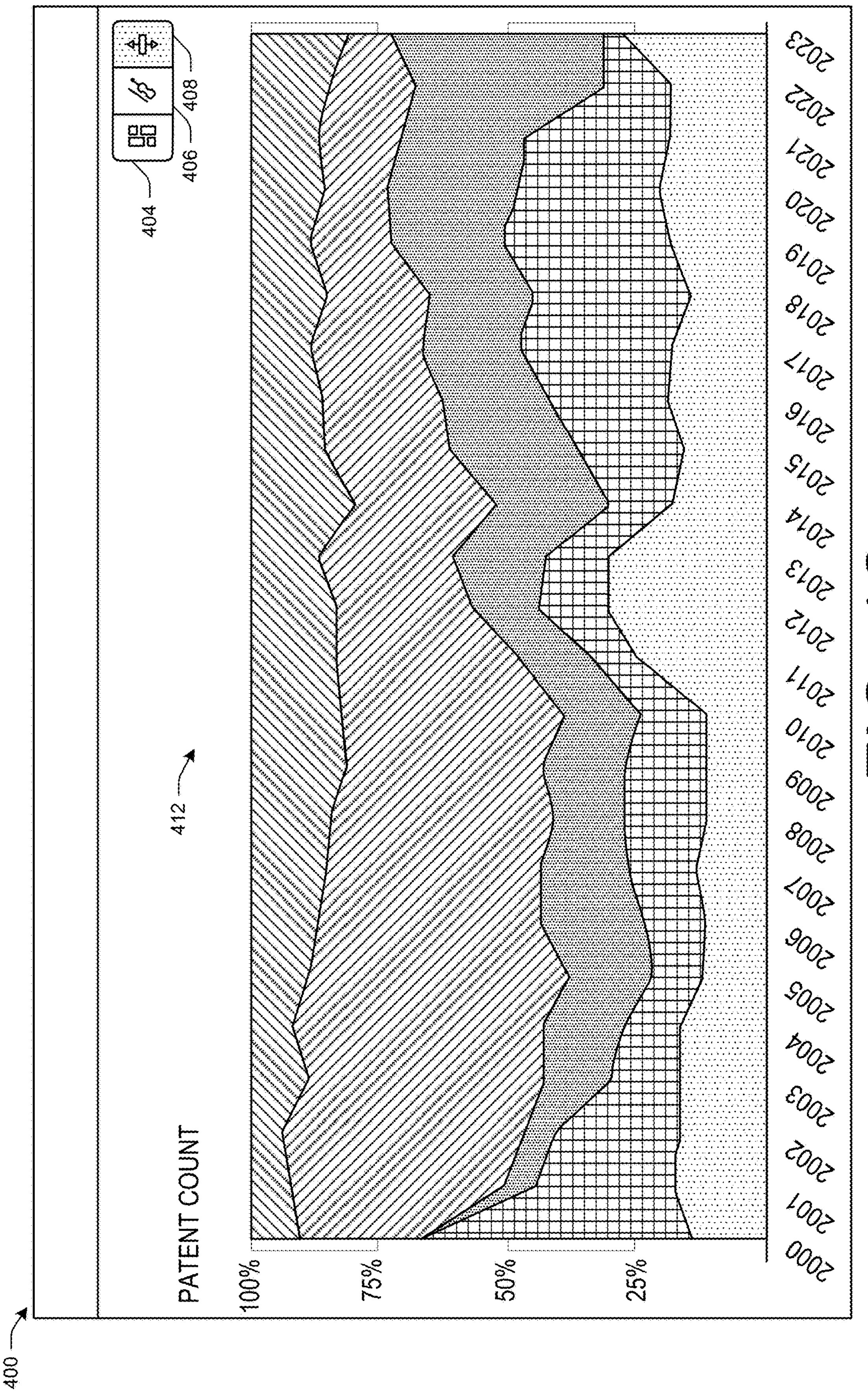
FIG. 4C illustrates an example user interface for displaying IP asset filing counts associated with multiple entities.

FIGS. 4A-4C illustrates an example user interface 400 configured to present data associated with a user account representing user created IP mapping research, project(s) and/or project(s) associated with a user account. A graph 402 illustrates an IP filing count associated with a particular technology area in which a number of entities, in this case five entities, are represented by different colors and a width of each band indicates an amount of IP asset filings over a given period of time, in this case between the years 2000 and 2023. The interface 400 may include selectable options 404, 406, and 408 that allow the user to generate different visualizations of the information presented on the user interface 400. For example, FIG. 4B illustrates a graph 410 presented in response to selecting the selectable option 406. In graph 410, the bands representing each entity are separated from one another. FIG. 4C illustrates a graph 412 presented in response to selecting the selectable option 408. In graph 410, the bands representing each entity are stacked on top of one another.

Figure 5A:
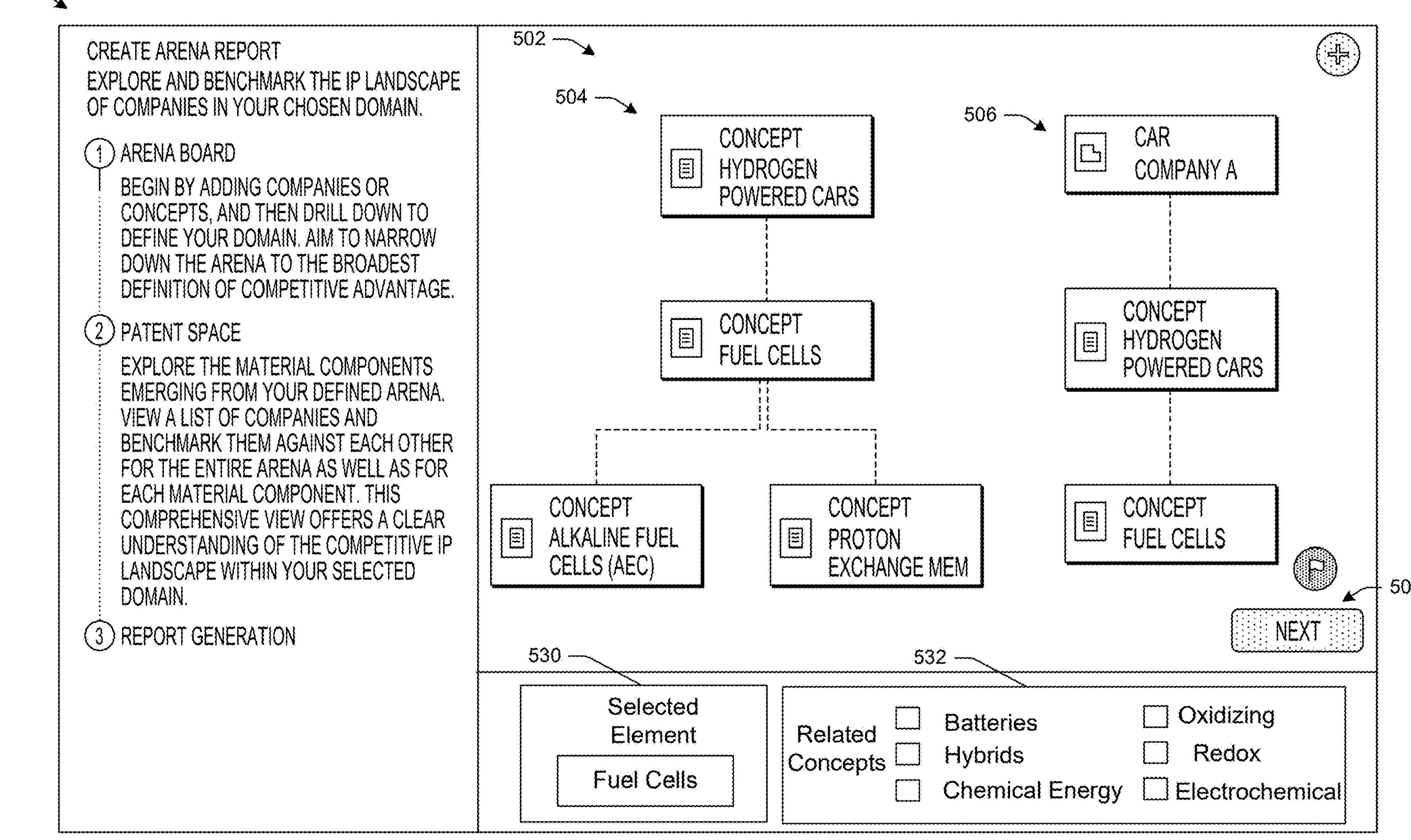
FIG. 5A illustrates an example user interface for receiving one or more user inputs.

FIG. 5A illustrates an example user interface 500 configured to present data associated with a user account representing user created IP mapping research, project(s) and/or project(s) associated with a user account. The interface 500 includes an interactive arena 502 that can receive target data used to generate one or more reports. For instance, the target data may include one or more target entities, one or more target publications, one or more text descriptions, one or more target products, one or more target technologies (e.g., technology areas), one or more target sub-technologies, one or more target components, and/or one or more target sub-components that the search component may utilize to generate a report. To generate a report, the interactive arena 502 enables users to add entities and/or technology areas (e.g., via selection of one or more flows from the interface 300) and then drill down to define a desired domain. The interactive arena 502 is able to narrow down the arena to the broadest definition of competitive advantage. The report may present material components identified based on the inputs provide in the interactive arena 502 and may include a list of companies benchmarked against each other for the entire arena as well as for each material component. This comprehensive view offers a clear understanding of the competitive IP landscape within a selected domain. In this case, the interactive arena 502 includes an input 504 and an input 506, both presented as flow charts. The input 504 includes a broadest input "Hydrogen Powered Cars," a narrower input "Fuel Cells," and two narrowest inputs, "Alkaline Fuel Cells (AFC)" and "Proton Exchange." The input 506 includes a broadest input "Car Company A," a narrower input "Hydrogen Powered Cars," and a narrowest input, "Fuel Cells." In some cases, the user interface 500 may include a "selected element" option 530 that enables a user to select one of the inputs (e.g., "Fuel Cells") and the interactive arena 502 may generate and present "related concepts" 532 that the user may select to add as additional inputs to the interactive arena 502. Once the inputs are entered into the interactive arena 502, the user may select selectable option 508 and in response, the mapping component 122 may generate a report 510 illustrated in FIG. 5B.

Figure 5B:
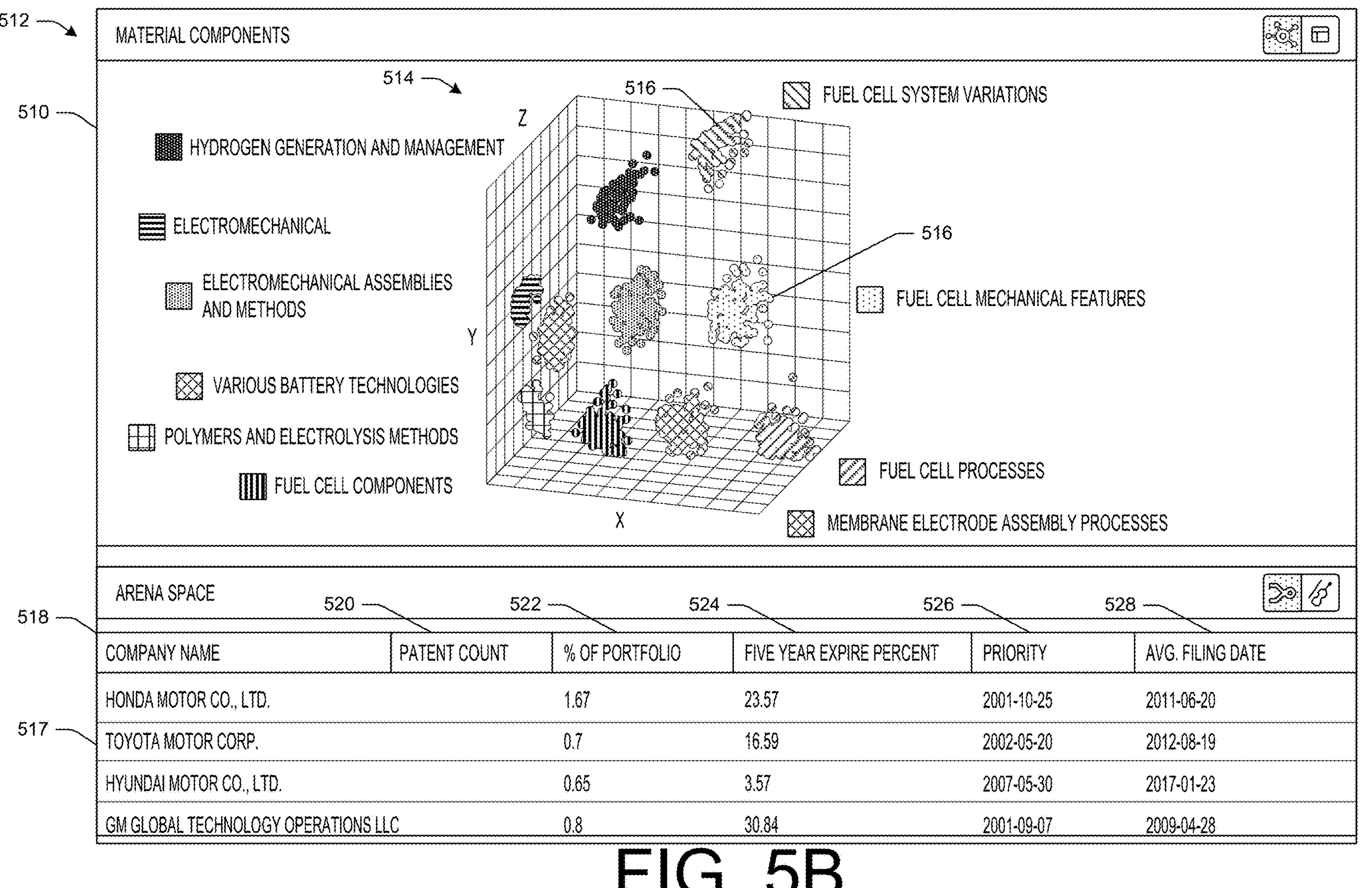
FIG. 5B illustrates an example user interface for displaying a three-dimensional (3D) cluster graph.

FIG. 5B illustrates a user interface 512 presenting the report 510 including a three-dimensional cluster graph 514 and a table 517. The data included in the report 510 may be based on the input 504 and/or the input 506 received via the interactive arena 502. In some examples, the cluster graph 514 may include a spatial representation of the clusters. In some examples, the spatial representation may include a background represented by white space, graphical indicators 516 associated with respective IP assets included in the clusters, keyword sets associated with respective clusters included in the report 510, a slider filter control, an animation sequence element, and/or a quick information overlay window. In some examples, the graphical indicators 516 may be represented as dots having a size corresponding to the relevance of the associated IP asset with respect to the other IP assets included in the cluster. It should be appreciated that the cluster graph 514 may include more graphical indicators 516 than indicated by the reference numerals. Additionally, or alternatively, the graphical indicators 516 may be color coded, such that IP assets that are included in a cluster of the selected result set may be represented by a graphical indicator 516 having a color associated with the cluster. In some examples, graphical indicators 516 belonging to separate clusters in a result set may have different colors that correspond to the respective cluster to which they belong. In some examples, the keyword sets may include one or more keywords associated with a respective cluster and may be presented at a central location of the cluster. Additionally, or alternatively, the keyword set may be represented in a color corresponding to the associated cluster. Additionally, or alternatively, the cluster graph 514 may be configured to be manipulated by various user inputs, such as, for example, a zoom action configured to enlarge or shrink the view of the interactive graphical element to a desired location of the spatial representation and/or a click and drag action configured to focus the view of the cluster graph 514 to a desired location of the spatial representation. In some examples, the slider filter control may be configured to receive user input representing a lower bound and/or an upper bound associated with a priority date and/or proprietary score associated with the IP assets included in the clusters of the selected result set. In some examples, the animation sequence element may be configured such that, when selected, the interactive graphical element may be caused to display an animated view of the spatial representation of the clusters. For example, the animated view may be configured as a time lapse animation, such that, the graphical elements 516 included in the spatial representation may appear and/or disappear according to the range specified by the lower bound and the upper bound of the slider filter control. Additionally, or alternatively, the animated view may be configured as a time lapse animation, such that, the graphical elements 516 included in the spatial representation may change color according to the assignee of the IP asset associated with a graphical element 516, such that, the time lapse animation may reflect the mergers and/or acquisitions associated with one or more entities over time. In some examples, the quick information overlay window may be displayed in response to a user hovering over a graphical element 516 in the spatial representation. In some examples, the slide filter control may be adjustable via slide mechanism such that the data presented in the cluster graph 514 changes based on a user moving the slide mechanism along the slide filter control without having to press the animation sequence element. In some examples, graphical elements 516 may have different densities such that some elements within each cluster are closer together than other cluster.

Graphical elements 516 having a higher density may indicate that the IP assets within that cluster are more relevant to the given technology space and/or material component associated with the given cluster. In contrast graphical elements 516 having a lower density may indicate that the IP assets within that cluster are less relevant to the given technology space and/or material component associated with the given cluster.

In some cases, the table 517 may include additional information corresponding to the IP assets and entities represented in the cluster graph 514. For example, the table 517 may include a company name column 518, a patent count column 520, a percentage of portfolio column 522, a 5 year expire percent column 524, a priority date column 526 and/or an average filing date column 528.

FIGS. 6-11 illustrate example processes associated with the IP mapping platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures and systems.

FIG. 6 illustrates an example flow diagram of an example process 600 that includes communicating with a language model interface to obtain products and/or technology areas associated with one or more entities. The order in which the operations or steps are described is not intended to be construed as a limitation, and any number of the described operations may be combined in any order and/or in parallel to implement process 600. The operations described with respect to the process 600 are described as being performed by an electronic device and/or a remote computing resource associated with the IP mapping platform. However, it should be understood that some or all of these operations may be performed by some or all of components, devices, and/or systems described herein.

At block 602, the process 600 may include sending a first query to a language model interface including a request for one or more products associated with the entity.

At block 604, the process 600 may include identifying the one or more products associated with the entity based at least in part on receiving a first output from the language model interface.

At block 606, the process 600 may include sending a second query to the language model interface including a request for one or more technology areas associated with the one or more products.

At block 608, the process 600 may include identifying the one or more technology areas associated with each of the one or more products based at least in part on a second output from the language model interface.

At block 610, the process 600 may include presenting, on a GUI displayed on a computing device, a flowchart including an entity name associated with the entity, the one or more products, and the one or more technology areas, wherein the flowchart illustrates the entity name mapped to the one or more products and the one or more products mapped to the one or more technology areas via a number of flows.

Additionally, or alternatively, the process 600 may include identifying at least a second entity based at least in part on the second entity being similar to the first entity; identifying one or more second products associate with second entity; identifying one or more second technology areas associated with each of the one or more second products; determining that a subset of technology areas are included in the one or more second technology areas and are not included in the one or more first technology areas; and presenting the subset of technology areas.

Additionally, or alternatively, the process 600 may include generating a similarity score based on a comparison of the one or more IP assets associated with the first entity and one or more IP assets associated with the second entity; determining that the similarity score is above a threshold value; and determining that the second entity is similar to the first entity based at least in part on the similarity score being above the threshold value.

Additionally, or alternatively, the process 600 may include identifying multiple other entities that are associated with at least one of the one or more products or the one or more technology areas; and performing one or more analysis on the multiple other entities, the one or more analysis including at least one of: ranking the multiple other entities based on an analysis of IP assets associated with each of the multiple other entities; determining a likelihood of litigation associated with each of the multiple other entities; or ranking the multiple other entities based on an acquisition score.

Additionally, or alternatively, the process 600 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively, the process 600 may include identifying other IP assets that are similar to the individual technology area associated with the at least one flow; identify one or more competitor entities associated with the individual technology area associated with the at least one flow; or determine an IP asset count associated with the individual technology area associated with the at least one flow.

FIG. 7 illustrates an example flow diagram of an example process 700 that includes communicating with a language model interface to obtain products and/or technology areas associated with one or more entities. The order in which the operations or steps are described is not intended to be construed as a limitation, and any number of the described operations may be combined in any order and/or in parallel to implement process 700. The operations described with respect to the process 700 are described as being performed by an electronic device and/or a remote computing resource associated with the IP mapping platform. However, it should be understood that some or all of these operations may be performed by some or all of components, devices, and/or systems described herein.

At block 702, the process 700 may include identifying an entity associated with one or more intellectual property (IP) assets.

At block 704, the process 700 may include sending a first query to a language model interface including a request for one or more products associated with the entity.

At block 706, the process 700 may include identifying the one or more products associated with the entity based at least in part on receiving a first output from the language model interface.

At block 708, the process 700 may include sending a second query to the language model interface including a request for one or more technology areas associated with the one or more products.

At block 710, the process 700 may include identifying the one or more technology areas associated with each of the one or more products based at least in part on a second output from the language model interface.

At block 712, the process 700 may include mapping the one or more IP assets to the one or more technology areas.

At block 714, the process 700 may include presenting, on a graphical user interface (GUI) displayed on a computing device, a flowchart including an entity name associated with the entity, the one or more products, the one or more technology areas, and the one or more IP assets, wherein the flowchart illustrates the entity name mapped to the one or more products and the one or more products mapped to the one or more technology areas via a number of flows.

Additionally, or alternatively, the process 700 may include identifying at least a second entity based at least in part on the second entity being similar to the first entity; identifying one or more second products associate with second entity; identifying one or more second technology areas associated with each of the one or more second products; determining that a subset of technology areas are included in the one or more second technology areas and are not included in the one or more first technology areas; and presenting the subset of technology areas.

Additionally, or alternatively, the process 700 may include generating a similarity score based on a comparison of the one or more IP assets associated with the first entity and one or more IP assets associated with the second entity; determining that the similarity score is above a threshold value; and determining that the second entity is similar to the first entity based at least in part on the similarity score being above the threshold value.

Additionally, or alternatively, the process 700 may include identifying multiple other entities that are associated with at least one of the one or more products or the one or more technology areas; and performing one or more analysis on the multiple other entities, the one or more analysis including at least one of: ranking the multiple other entities based on an analysis of IP assets associated with each of the multiple other entities; determining a likelihood of litigation associated with each of the multiple other entities; or ranking the multiple other entities based on an acquisition score.

Additionally, or alternatively, the process 700 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively, the process 700 may include identifying other IP assets that are similar to the individual technology area associated with the at least one flow; identify one or more competitor entities associated with the individual technology area associated with the at least one flow; or determine an IP asset count associated with the individual technology area associated with the at least one flow.

Figure 8:
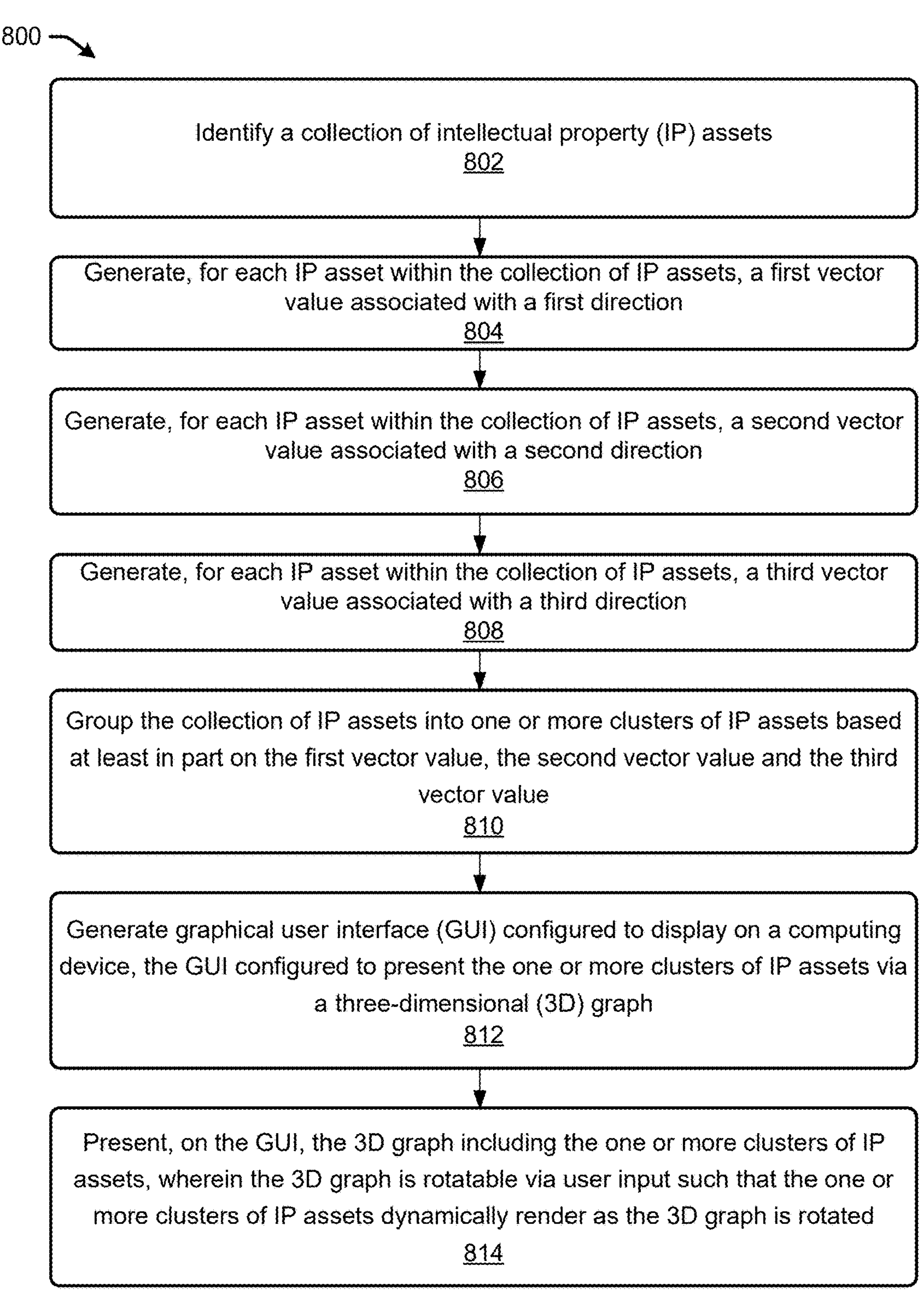
FIG. 8 illustrates an example flow diagram of an example process for generating a 3D cluster graph.

FIG. 8 illustrates an example flow diagram of an example process 800 that includes generating a 3D cluster graph. The order in which the operations or steps are described is not intended to be construed as a limitation, and any number of the described operations may be combined in any order and/or in parallel to implement process 800. The operations described with respect to the process 800 are described as being performed by an electronic device and/or a remote computing resource associated with the IP mapping platform. However, it should be understood that some or all of these operations may be performed by some or all of components, devices, and/or systems described herein.

At block 802, the process 800 may include identifying a collection of IP assets.

At block 804, the process 800 may include generating, for each IP asset within the collection of IP assets, a first vector value associated with a first direction.

At block 806, the process 800 may include generating, for each IP asset within the collection of IP assets, a second vector value associated with a second direction.

At block 808, the process 800 may include generating, for each IP asset within the collection of IP assets, a third vector value associated with a third direction.

At block 810, the process 800 may include grouping the collection of IP assets into one or more clusters of IP assets based at least in part on the first vector value, the second vector value and the third vector value.

At block 812, the process 800 may include generating a GUI configured to display on a computing device, the GUI configured to present the one or more clusters of IP assets via a three-dimensional (3D) graph.

At block 814, the process 800 may include presenting, on the GUI, the 3D graph including the one or more clusters of IP assets, wherein the 3D graph is rotatable via user input such that the one or more clusters of IP assets dynamically render as the 3D graph is rotated.

Additionally, or alternatively, the process 800 may include the first vector value, the second vector value and the third vector value being generated using.

Additionally, or alternatively, the process 800 may include presenting, on the GUI displayed on the computing device, a flowchart including an entity name associated with a first entity, one or more products, and one or more technology areas, wherein the flowchart illustrates the entity name mapped to the one or more products and the one or more products mapped to the one or more technology areas.

Additionally, or alternatively, the process 800 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively, the process 800 may include generating the 3D graph is in response to receiving the instruction to perform the additional analysis.

Additionally, or alternatively, the process 800 may include a width of each flow indicating a number of IP assets.

Additionally, or alternatively, the process 800 may include determining a first number of IP assets that include a cosine similarity value above the threshold value, determining a second number of IP assets of the first number of IP assets that are assigned to the entity, determining a third number of IP assets of the first number of IP assets that are not assigned to the entity, determining a supply chain metric based at least in part on comparing the second number of IP assets to the third number of IP assets.

Additionally, or alternatively, the process 800 may include displaying at least one metric associated with or more clusters of IP assets that indicates at least one of: geographical data; breadth data; expiration data; diversity data; revenue alignment data; invalidity data; filing velocity data; spending data; predictive analytics data; precedence data; litigation data; market data; or revenue alignment data.

Figure 9:
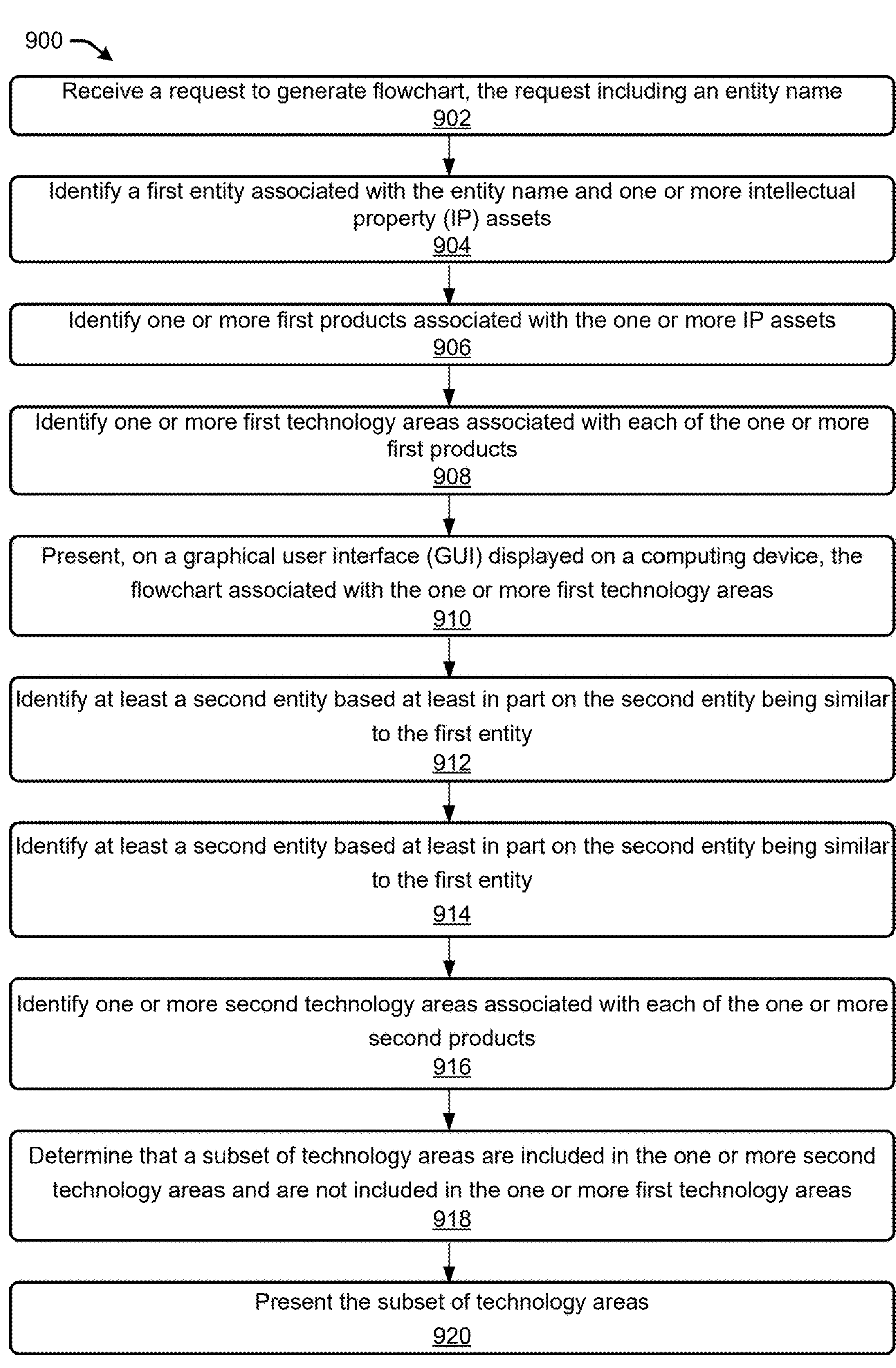
FIG. 9 illustrates an example flow diagram of an example process for identifying one or more products and/or technology areas associated with an entity.

FIG. 9 illustrates an example flow diagram of an example process 900 that includes identifying one or more products and/or technology areas associated with an entity. The order in which the operations or steps are described is not intended to be construed as a limitation, and any number of the described operations may be combined in any order and/or in parallel to implement process 900. The operations described with respect to the process 900 are described as being performed by an electronic device and/or a remote computing resource associated with the IP mapping platform. However, it should be understood that some or all of these operations may be performed by some or all of components, devices, and/or systems described herein.

At block 902, the process 900 may include receiving a request to generate flowchart, the request including an entity name.

At block 904, the process 900 may include identifying a first entity associated with the entity name and one or more IP assets.

At block 906, the process 900 may include identifying one or more first products associated with the one or more IP assets.

At block 908, the process 900 may include identifying one or more first technology areas associated with each of the one or more first products.

At block 910, the process 900 may include presenting, on a GUI displayed on a computing device, the flowchart associated with the one or more first technology areas.

At block 912, the process 900 may include identifying at least a second entity based at least in part on the second entity being similar to the first entity.

At block 914, the process 900 may include identifying at least a second entity based at least in part on the second entity being similar to the first entity.

At block 916, the process 900 may include identifying one or more second technology areas associated with each of the one or more second products.

At block 918, the process 900 may include determining that a subset of technology areas are included in the one or more second technology areas and are not included in the one or more first technology areas.

At block 920, the process 900 may include presenting the subset of technology areas.

Additionally, or alternatively the process 900 may include including the entity name associated with the first entity, the one or more first products, and the one or more first technology areas in the flowchart, wherein the flowchart illustrates the entity name mapped to the one or more first products and the one or more first products mapped to the one or more first technology areas.

Additionally, or alternatively the process 900 may include generating a similarity score based on a comparison of the one or more IP assets associated with the first entity and one or more IP assets associated with the second entity; determining that the similarity score is above a threshold value; and determining that the second entity is similar to the first entity based at least in part on the similarity score being above the threshold value.

Additionally, or alternatively the process 900 may include identifying multiple other entities that are associated with at least one of the one or more first products or the one or more first technology areas; and performing one or more analysis on the multiple other entities, the one or more analysis including at least one of: ranking the multiple other entities based on an analysis of IP assets associated with each of the multiple other entities; determining a likelihood of litigation associated with each of the multiple other entities; or ranking the multiple other entities based on an acquisition score.

Additionally, or alternatively the process 900 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively the process 900 may include the additional analysis includes at least one of: identifying other IP assets that are similar to the individual technology area associated with the at least one flow; identifying one or more competitor entities associated with the individual technology area associated with the at least one flow; and determining an IP asset count associated with the individual technology area associated with the at least one flow.

Additionally, or alternatively the process 900 may include sending a query to a language model interface including the entity name and a request for the one or more first products associated with the one or more IP assets and the one or more first technology areas associated with each of the one or more first products; receiving an output from the language model interface; and identifying the one or more first products associated with the one or more IP assets and the one or more first technology areas associated with each of the one or more first products based at least in part on the output.

Figure 10:
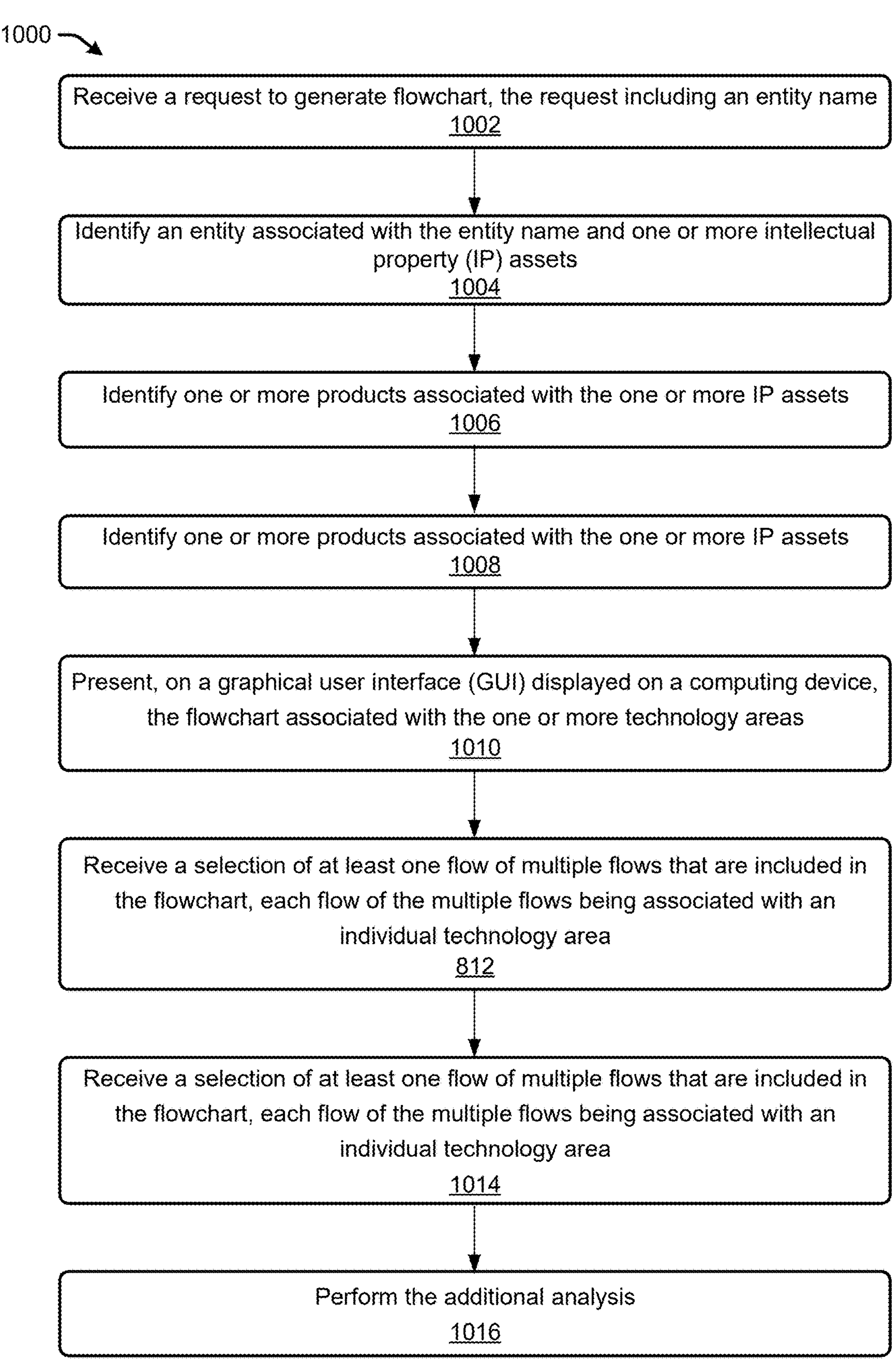
FIG. 10 illustrates an example flow diagram of an example process for identifying one or more products and/or technology areas associated with an entity.

FIG. 10 illustrates an example flow diagram of an example process 1000 that includes identifying one or more products and/or technology areas associated with an entity. The order in which the operations or steps are described is not intended to be construed as a limitation, and any number of the described operations may be combined in any order and/or in parallel to implement process 1000. The operations described with respect to the process 1000 are described as being performed by an electronic device and/or a remote computing resource associated with the IP mapping platform. However, it should be understood that some or all of these operations may be performed by some or all of components, devices, and/or systems described herein.

At block 1002, the process 1000 may include receiving a request to generate flowchart, the request including an entity name.

At block 1004, the process 1000 may include identifying an entity associated with the entity name and one or more IP assets.

At block 1006, the process 1000 may include identifying one or more products associated with the one or more IP assets.

At block 1008, the process 1000 may include identifying one or more technology areas associated with each of the one or more products.

At block 1010, the process 1000 may include presenting, on a GUI displayed on a computing device, the flowchart associated with the one or more technology areas.

At block 1012, the process 1000 may include receiving a selection of at least one flow of multiple flows that are included in the flowchart, each flow of the multiple flows being associated with an individual technology area.

At block 1014, the process 1000 may include receiving an instruction to perform additional analysis the at least one flow.

At block 1016, the process 1000 may include performing the additional analysis.

Additionally, or alternatively the process 1000 may include including the entity name associated with the first entity, the one or more first products, and the one or more first technology areas in the flowchart, wherein the flowchart illustrates the entity name mapped to the one or more first products and the one or more first products mapped to the one or more first technology areas.

Additionally, or alternatively the process 1000 may include generating a similarity score based on a comparison of the one or more IP assets associated with the first entity and one or more IP assets associated with the second entity; determining that the similarity score is above a threshold value; and determining that the second entity is similar to the first entity based at least in part on the similarity score being above the threshold value.

Additionally, or alternatively the process 1000 may include identifying multiple other entities that are associated with at least one of the one or more first products or the one or more first technology areas; and performing one or more analysis on the multiple other entities, the one or more analysis including at least one of: ranking the multiple other entities based on an analysis of IP assets associated with each of the multiple other entities; determining a likelihood of litigation associated with each of the multiple other entities; or ranking the multiple other entities based on an acquisition score.

Additionally, or alternatively the process 1000 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively the process 1000 may include the additional analysis includes at least one of: identifying other IP assets that are similar to the individual technology area associated with the at least one flow; identifying one or more competitor entities associated with the individual technology area associated with the at least one flow; and determining an IP asset count associated with the individual technology area associated with the at least one flow.

Additionally, or alternatively the process 1000 may include sending a query to a language model interface including the entity name and a request for the one or more first products associated with the one or more IP assets and the one or more first technology areas associated with each of the one or more first products; receiving an output from the language model interface; and identifying the one or more first products associated with the one or more IP assets and the one or more first technology areas associated with each of the one or more first products based at least in part on the output.

FIG. 11 illustrates an example flow diagram of an example process 1100 that includes generating visual representations that are presented on a graph including a timeline on an x-axis and an indication of an IP asset filing volume on a y-axis. The order in which the operations or steps are described is not intended to be construed as a limitation, and any number of the described operations may be combined in any order and/or in parallel to implement process 1100. The operations described with respect to the process 1100 are described as being performed by an electronic device and/or a remote computing resource associated with the IP mapping platform. However, it should be understood that some or all of these operations may be performed by some or all of components, devices, and/or systems described herein.

At block 1102, the process 1100 may include identifying a first entity associated with first IP assets.

At block 1104, the process 1100 may include identifying a technology area associated with the first IP assets.

At block 1106, the process 1100 may include identifying a first number of the first IP assets filed between a first date and a second date, the first IP assets being associated with the technology area.

At block 1108, the process 1100 may include identifying a second entity associated with the technology area.

At block 1110, the process 1100 may include identifying a second number of second IP assets filed between the first date and the second date, the second IP assets being associated with the technology area.

At block 1112, the process 1100 may include generating a GUI configured to display on a computing device.

At block 1114, the process 1100 may include generating a first visual representation associated with the first number of the first IP assets, wherein a first width of the first visual representation indicates a first value of the first number of the first number of IP assets.

At block 1116, the process 1100 may include generating a second visual representation associated with the second number of the second IP assets, wherein a second width of the second visual representation indicates a second value of the second number of the second number of IP assets.

At block 1118, the process 1100 may include causing the GUI to be displayed via a display of the computing device, the GUI including the first visual representation and the second visual representation, wherein the first visual representation and the second visual representation are presented on a graph including a timeline based on the first date and the second date on an x-axis and an indication of an IP asset filing volume on a y-axis such that for any point in time between the first date and the second date the first visual representation may indicate a first amount of IP assets filed at the point in time and the second visual representation may indicate a second amount of IP assets filed at the point in time.

Additionally, or alternatively, the process 1100 may include receiving user input via a selectable option; and causing, based at least in part on receiving the user input, the first visual representation to stack on top of the second visual representation.

Additionally, or alternatively, the process 1100 may include the graph being initially presented in a first mode, the method further comprising receiving a user input via a selectable option and causing the graph to switch from the first mode to a second mode, the first mode including the first visual representation and the second visual representation being separated and the second mode including the first visual representation and the second visual representation being stacked.

Additionally, or alternatively, the process 1100 may include presenting, on the GUI displayed on the computing device, a flowchart including an entity name associated with the first entity, one or more products, and one or more technology areas, wherein the flowchart illustrates the entity name mapped to the one or more products and the one or more products mapped to the one or more technology areas.

Additionally, or alternatively, the process 1100 may include receiving a selection of at least one flow of multiple flows that are included in the flowchart, each flow of the multiple flows being associated with an individual technology area; receiving an instruction to perform additional analysis the at least one flow; and performing the additional analysis.

Additionally, or alternatively, the process 1100 may include generating the first visual representation and the second visual representation being in response to receiving the instruction to perform the additional analysis.

Additionally, or alternatively, the process 1100 may include identifying a third entity associated with the technology area; determining a third number of third IP assets that are associated with the third entity; generating a third visual representation associated with the third number of the third IP assets, wherein a third width of the third visual representation indicates a third value of the third number of the third number of IP assets; and causing the GUI to present the third visual representation.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:

sending a first query to a language model interface including a request for one or more products associated with an entity;

identifying the one or more products associated with the entity based at least in part on receiving a first output from the language model interface;

automatically, and without human intervention, generating a second query including a request for one or more technology areas associated with the one or more products;

sending the second query to the language model interface including the request for the one or more technology areas associated with the one or more products;

identifying the one or more technology areas associated with each of the one or more products based at least in part on a second output from the language model interface;

generating, by a vector component, a vector representation of a text description included in at least one of the first output or the second output, wherein the vector representation comprises a list of floating-point numbers based at least in part on text contents of the text description;

identifying one or more intellectual property (IP) assets from an IP asset library based at least in part on determining a similarity value between the vector representation of the text description and vector representations of the one or more IP assets, wherein the similarity value comprises a cosine similarity value above a predetermined threshold;

generating, programmatically and without human intervention, user interface elements configured to be utilized in a graphical user interface (GUI), wherein the user interface elements are specific to the first output, the second output, and the identified one or more IP assets, and are generated in real time after the second output is received, wherein a width of each user interface element corresponds to a number of the identified one or more IP assets associated with a respective technology area; and presenting, on the GUI displayed on a computing device, the user interface elements in a form of a flowchart including an entity name associated with the entity, the one or more products, and the one or more technology areas, wherein the flowchart illustrates the entity name mapped to the one or more products and the one or more products mapped to the one or more technology areas via a number of flows, wherein each flow of the number of flows is selectable to perform additional analysis including at least one of identifying other IP assets similar to an individual technology area or determining an IP asset count associated with the individual technology area.

2. The method of claim 1, wherein the entity is a first entity, the one or more products are one or more first products, and the one or more technology areas are one or more first technology areas, the method further comprising:

identifying at least a second entity based at least in part on the second entity being similar to the first entity;

identifying one or more second products associate with second entity;

identifying one or more second technology areas associated with each of the one or more second products;

determining that a subset of technology areas are included in the one or more second technology areas and are not included in the one or more first technology areas; and presenting the subset of technology areas.

3. The method of claim 2, further comprising:

generating a similarity score based on a comparison of one or more IP assets associated with the first entity and one or more IP assets associated with the second entity;

determining that the similarity score is above a threshold value; and determining that the second entity is similar to the first entity based at least in part on the similarity score being above the threshold value.

4. The method of claim 1, further comprising:

identifying multiple other entities that are associated with at least one of the one or more products or the one or more technology areas; and performing one or more analysis on the multiple other entities, the one or more analysis including at least one of:

ranking the multiple other entities based on an analysis of IP assets associated with each of the multiple other entities;

determining a likelihood of litigation associated with each of the multiple other entities; or ranking the multiple other entities based on an acquisition score.

5. The method of claim 1, further comprising:

receiving a selection of at least one flow of multiple flows that are included in the flowchart, each flow of the multiple flows being associated with an individual technology area;

receiving an instruction to perform additional analysis the at least one flow; and performing the additional analysis.

6. The method of claim 5, wherein the additional analysis includes at least one of:

identifying other IP assets that are similar to the individual technology area associated with the at least one flow;

identify one or more competitor entities associated with the individual technology area associated with the at least one flow; or determine an IP asset count associated with the individual technology area associated with the at least one flow.

7. The method of claim 1, wherein each of the number of flows are selectable via user input such that an individual technology area may be selected for additional analysis.

8. A system comprising:

one or more processors; and one or more non-transitory computer-readable media comprising instructions that, when executed by the one or more processors, cause the one or more processors to perform operations comprising:

sending a first query to a language model interface including a request for one or more products associated with an entity;

identifying the one or more products associated with the entity based at least in part on receiving a first output from the language model interface;

automatically, and without human intervention, generating a second query including a request for one or more technology areas associated with the one or more products;

sending the second query to the language model interface including the request for the one or more technology areas associated with the one or more products;

identifying the one or more technology areas associated with each of the one or more products based at least in part on a second output from the language model interface;

generating, by a vector component, a vector representation of a text description included in at least one of the first output or the second output, wherein the vector representation comprises a list of floating-point numbers based at least in part on text contents of the text description;

identifying one or more intellectual property (IP) assets from an IP asset library based at least in part on determining a similarity value between the vector representation of the text description and vector representations of the one or more IP assets, wherein the similarity value comprises a cosine similarity value above a predetermined threshold;

generating, programmatically and without human intervention, user interface elements configured to be utilized in a graphical user interface (GUI), wherein the user interface elements are specific to the first output, the second output, and the identified one or more IP assets, and are generated in real time after the second output is received, wherein a width of each user interface element corresponds to a number of the identified one or more IP assets associated with a respective technology area; and presenting, on the GUI displayed on a computing device, the user interface elements in a form of a flowchart including an entity name associated with the entity, the one or more products, and the one or more technology areas, wherein the flowchart illustrates the entity name mapped to the one or more products and the one or more products mapped to the one or more technology areas via a number of flows, wherein each flow of the number of flows is selectable to perform additional analysis including at least one of identifying other IP assets similar to an individual technology area or determining an IP asset count associated with the individual technology area.

9. The system of claim 8, wherein the entity is a first entity, the one or more products are one or more first products, and the one or more technology areas are one or more first technology areas, the operations further comprising:

identifying at least a second entity based at least in part on the second entity being similar to the first entity;

identifying one or more second products associate with second entity;

identifying one or more second technology areas associated with each of the one or more second products;

determining that a subset of technology areas are included in the one or more second technology areas and are not included in the one or more first technology areas; and presenting the subset of technology areas.

10. The system of claim 9, further comprising:

generating a similarity score based on a comparison of one or more IP assets associated with the first entity and one or more IP assets associated with the second entity;

determining that the similarity score is above a threshold value; and determining that the second entity is similar to the first entity based at least in part on the similarity score being above the threshold value.

11. The system of claim 8, further comprising:

identifying multiple other entities that are associated with at least one of the one or more products or the one or more technology areas; and performing one or more analysis on the multiple other entities, the one or more analysis including at least one of:

ranking the multiple other entities based on an analysis of IP assets associated with each of the multiple other entities;

determining a likelihood of litigation associated with each of the multiple other entities; or ranking the multiple other entities based on an acquisition score.

12. The system of claim 8, further comprising:

receiving a selection of at least one flow of multiple flows that are included in the flowchart, each flow of the multiple flows being associated with an individual technology area;

receiving an instruction to perform additional analysis the at least one flow; and performing the additional analysis.

13. The system of claim 12, wherein the additional analysis includes at least one of:

identifying other IP assets that are similar to the individual technology area associated with the at least one flow;

identify one or more competitor entities associated with the individual technology area associated with the at least one flow; or determine an IP asset count associated with the individual technology area associated with the at least one flow.

14. The system of claim 8, wherein each of the number of flows are selectable via user input such that an individual technology area may be selected for additional analysis.

15. A method comprising:

identifying one or more products associated with an entity;

automatically, and without human intervention, generating a query including a request for one or more technology areas associated with the one or more products;

identifying the one or more technology areas associated with each of the one or more products based at least in part on output from a language model with the query as input to the language model;

generating, by a vector component, a vector representation of a text description included in the output, wherein the vector representation comprises a list of floating-point numbers based at least in part on text contents of the text description;

identifying one or more intellectual property (IP) assets from an IP asset library based at least in part on determining a similarity value between the vector representation of the text description and vector representations of the one or more IP assets, wherein the similarity value comprises a cosine similarity value above a predetermined threshold;

generating, programmatically and without human intervention, user interface elements configured to be utilized in a graphical user interface (GUI), wherein the user interface elements are specific to the output and the identified one or more IP assets, and are generated in real time after the output is received, wherein a width of each user interface element corresponds to a number of the identified one or more IP assets associated with a respective technology area; and presenting, on the GUI displayed on a computing device, the user interface elements in a form of a flowchart including an entity name associated with the entity, the one or more products, and the one or more technology areas, wherein the flowchart illustrates the entity name mapped to the one or more products and the one or more products mapped to the one or more technology areas via a number of flows, wherein each flow of the number of flows is selectable to perform additional analysis including at least one of identifying other IP assets similar to an individual technology area or determining an IP asset count associated with the individual technology area.

16. The method of claim 15, wherein the entity is a first entity, the one or more products are one or more first products, and the one or more technology areas are one or more first technology areas, the method further comprising:

identifying at least a second entity based at least in part on the second entity being similar to the first entity;

identifying one or more second products associate with second entity;

identifying one or more second technology areas associated with each of the one or more second products;

determining that a subset of technology areas are included in the one or more second technology areas and are not included in the one or more first technology areas; and presenting the subset of technology areas.

17. The method of claim 16, further comprising:

generating a similarity score based on a comparison of one or more IP assets associated with the first entity and one or more IP assets associated with the second entity;

determining that the similarity score is above a threshold value; and determining that the second entity is similar to the first entity based at least in part on the similarity score being above the threshold value.

18. The method of claim 15, further comprising:

identifying multiple other entities that are associated with at least one of the one or more products or the one or more technology areas; and performing one or more analysis on the multiple other entities, the one or more analysis including at least one of:

ranking the multiple other entities based on an analysis of IP assets associated with each of the multiple other entities;

determining a likelihood of litigation associated with each of the multiple other entities; or ranking the multiple other entities based on an acquisition score.

19. The method of claim 15, further comprising:

receiving a selection of at least one flow of multiple flows that are included in the flowchart, each flow of the multiple flows being associated with an individual technology area;

receiving an instruction to perform additional analysis the at least one flow; and performing the additional analysis.

20. The method of claim 19, wherein the additional analysis includes at least one of:

identifying other IP assets that are similar to the individual technology area associated with the at least one flow;

identify one or more competitor entities associated with the individual technology area associated with the at least one flow; or determine an IP asset count associated with the individual technology area associated with the at least one flow.

* * * * *